United States Patent
Neogi et al.

(10) Patent No.: US 10,693,948 B2
(45) Date of Patent: Jun. 23, 2020

(54) PROVISIONING OF CONTAINERS FOR VIRTUALIZED APPLICATIONS

(71) Applicant: BLADELOGIC, INC., Houston, TX (US)

(72) Inventors: Atanu Neogi, Brookline, MA (US); Ajoy Kumar, Santa Clara, CA (US); Soumee Phatak, Pune (IN)

(73) Assignee: BladeLogic Inc., Houston, TX (US)

( * ) Notice: Subject to any disclaimer, the term of this patent is extended or adjusted under 35 U.S.C. 154(b) by 316 days.

(21) Appl. No.: 15/450,936

(22) Filed: Mar. 6, 2017

(65) Prior Publication Data
US 2017/0257424 A1 Sep. 7, 2017

Related U.S. Application Data

(60) Provisional application No. 62/303,820, filed on Mar. 4, 2016.

(51) Int. Cl.
*H04L 29/08* (2006.01)
*G06F 9/50* (2006.01)
(Continued)

(52) U.S. Cl.
CPC .......... *H04L 67/10* (2013.01); *G06F 9/5044* (2013.01); *H04L 43/16* (2013.01); *H04L 45/122* (2013.01); *H04L 47/781* (2013.01)

(58) Field of Classification Search
CPC .. G06F 9/5055; G06F 9/45558; G06F 9/4881; G06F 11/301; G06F 11/302;
(Continued)

(56) References Cited

U.S. PATENT DOCUMENTS 8,396,807 B1 * 3/2013 Yemini .................. G06Q 10/06 705/59
10,191,778 B1 * 1/2019 Yang ...................... G06F 9/5055
(Continued)

FOREIGN PATENT DOCUMENTS

WO 2015/032430 A1 3/2015

OTHER PUBLICATIONS

T. Liu: "Docker with OpenContrail", OpenContrail Blog, available online at <http://www.opencontrail.org/docker-with-opencontrail/#>, Sep. 20, 2014, 5 pages.
(Continued)

*Primary Examiner* — Aftab N. Khan
(74) *Attorney, Agent, or Firm* — Brake Hughes Bellermann LLP

(57) ABSTRACT

In a general aspect, a computer-implemented method can include receiving a request to provision a plurality of containers of an application across a plurality of data center hosts and iteratively placing the plurality of containers on the plurality of data center hosts. The containers can be selected for placement based on one of a locality constraint and an association with previously-placed containers. Placement of a selected container can be based on, at least, compute requirements of the selected container, network requirements of the selected container, configuration of the plurality of data center hosts, and performance metrics for the plurality of data center hosts.

23 Claims, 9 Drawing Sheets

(51) Int. Cl.
*H04L 12/26* (2006.01)
*H04L 12/733* (2013.01)
*H04L 12/911* (2013.01)

(58) Field of Classification Search
CPC ...... G06F 11/3006; G06F 9/455; H04L 43/08; H04L 67/1002; H04L 67/10; H04L 67/1023; G06Q 30/0635; G06Q 20/065; G06Q 30/0283; G06Q 20/145
See application file for complete search history.

(56) References Cited

U.S. PATENT DOCUMENTS

| | | | | |
|---|---|---|---|---|
| 2006/0004765 | A1* | 1/2006 | Anderson | G06F 16/10 |
| 2006/0212332 | A1* | 9/2006 | Jackson | G06F 9/5027 709/226 |
| 2006/0265470 | A1* | 11/2006 | Rolia | G06F 9/5027 709/217 |
| 2007/0233868 | A1* | 10/2007 | Tyrrell | G06F 3/0605 709/226 |
| 2008/0201409 | A1* | 8/2008 | Vul | G06F 9/5005 709/203 |
| 2012/0226796 | A1* | 9/2012 | Morgan | H04L 12/1453 709/224 |
| 2013/0055252 | A1* | 2/2013 | Lagar-Cavilla | G06F 9/5016 718/1 |
| 2014/0047342 | A1* | 2/2014 | Breternitz | G06F 9/5061 715/735 |
| 2015/0169306 | A1 | 6/2015 | Labocki et al. | |
| 2015/0193245 | A1 | 7/2015 | Cropper | |
| 2017/0201761 | A1* | 7/2017 | Walker | H04N 19/46 |

OTHER PUBLICATIONS

S. Yegulalp: "Weave project knits together networks for Docket containers", Infoworld Tech Watch, available online at <http://www.infoworld.com/article/2608941/application-virtualization/weave-project-knits-together-networks-for-docker-containers.html>, Sep. 9, 2014, 2 pages.

"What is Docker", available online at <https://www.docker.com/what-docker>, Oct. 2015, 8 pages.

"What is Kubernetes", available online at <https://kubernetes.io/docs/concepts/overview/what-is-kubernetes/>, retrieved from the Internet on Jun. 9, 2017, 7 pages.

International Search Report and Written Opinion received for PCT Patent Application No. PCT/US2017/020947, dated Jun. 19, 2017, 13 pages.

* cited by examiner

405 {
- Application
  - name: sample-three-tier

410 {
- Webserver
  - name: W
  - image: "Webserver_image"
  - cpu:10
  - mem:5
  - scale:10
  - security:OWASP
  - AvailabilityZones:2

420 {
- Appserver:
  - name: A
  - image: "Appserver_image"
  - cpu:50
  - mem:8
  - AvailabilityZones:1

430 {
- Dbserver:
  - name: D
  - file:/var/lib/database
  - image: "Dbserver_image"
  - cpu:90
  - mem:16
  - security: PCI
  - AvailabilityZones:1

440 {
- Weights:
  - weight-compute=0.3
  - weight-network=0.4
  - weight-security=0.3

450 {
- Connection:
  - source:internet
  - dest:W
  - direction:both
  - bw:50

460 {
- Connection:
  - source: W
  - dest: A
  - bw:500
  - scaling: if bw > 500 and < 1000, scale-up, if bw>1000, scale-out 470 {
- Connection:
  - source:A
  - dest:D
  - bw: 20000

FIG. 4

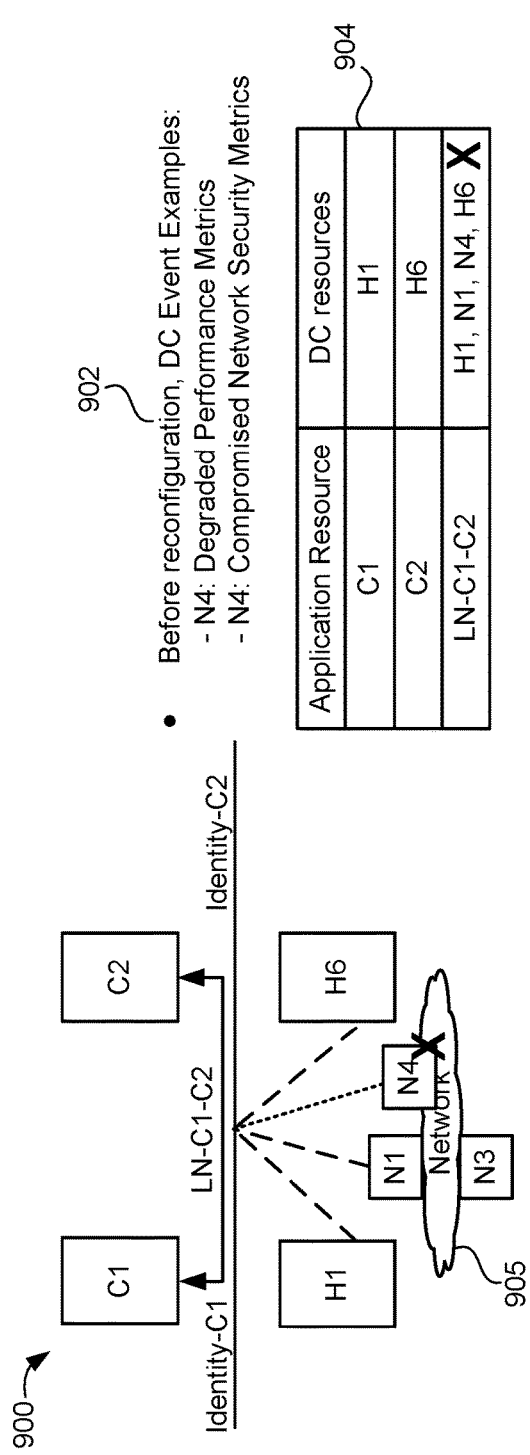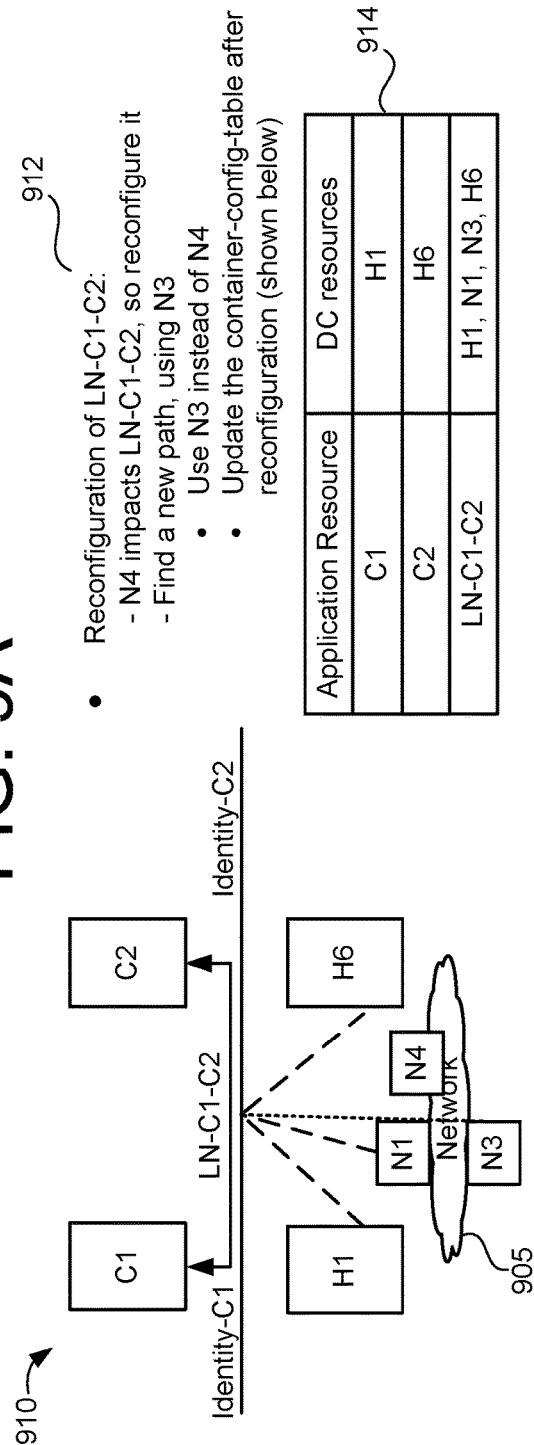
FIG. 9A
FIG. 9B

PROVISIONING OF CONTAINERS FOR VIRTUALIZED APPLICATIONS

CROSS-REFERENCE TO RELATED APPLICATIONS

This application is a Non-Provisional of, and claims priority to, U.S. Provisional Application No. 62/303,820, filed Mar. 4, 2016, entitled "TRANSPARENT AND SEAMLESS NETWORK VIRTUALIZATION FOR CONTAINER MANAGEMENT," the disclosure of which is incorporated herein in its entirety.

BACKGROUND

Approaches for providing virtualized computing resources are continually evolving. For instance, container technologies and corresponding container clustering platforms are rapidly emerging as a solution for implementing flexible and scalable application virtualization mechanisms. In such approaches, a given application can be implemented using a set of containers (e.g., with different functions) that are provisioned (implemented, etc.) on a set of computing resources, where the computing resources can be physical (e.g., on-premise hardware) computing resources, virtual computing resources (e.g., virtualized in a data center or multiple data centers), container clustering platforms, or a combination of such physical and virtual resources that are included in, e.g., a virtual private network (VPN).

Such container technologies, while providing significant flexibility in application development and deployment (initial deployment and updates), present unprecedented challenges for managing Information Technology resources (e.g., physical and/or virtual computing resources) used to implement "containerized" applications. Such challenges are due, at least in part, to the scalability and potential rate of modification of containerized applications, as such applications can be implemented using hundreds to of thousands of individual containers that are interconnected using virtual network segments or super-segments and scaled to account for, e.g., availability requirements of the application. Such management challenges can also include, in addition to the considerations noted above, managing isolation of containerized applications, e.g., when implemented, at least in part, using virtualized computing resources that may share underlying physical resources with other (unrelated) applications.

SUMMARY

In a general aspect, a computer-implemented method can include receiving a request to provision a plurality of containers of an application across a plurality of data center hosts; identifying, from the plurality of containers, a first container to provision based on, at least, a computing resource to be used to implement the first container and network requirements between the first container and the computing resource; and selecting a first host from the plurality of data center hosts to implement the first container based on, at least, compute requirements of the first container, the network requirements between the first container and the computing resource, configuration of the plurality of data center hosts, and performance metrics of the plurality of data center hosts. The method can also include identifying, from the plurality of containers, a second container to provision based on, at least, network requirements between the second container and the first container; and selecting a second host from the plurality of data center hosts to implement the second container based on, at least, compute requirements of the second container, the network requirements between the second container and the first container, the configuration of the plurality of data center hosts, and the performance metrics of the plurality of data center hosts.

Implementations can include one or more of the following features. For example, the compute requirements of the first container can include a processor requirement of the first container and a storage requirement of the first container. The network requirements between the first container and the computing resource can include at least one of a bandwidth requirement, a maximum number of hops requirement, and a latency requirement. The compute requirements of the second container can include a processor requirement and a storage requirement. The network requirements between the second container and the first container can include at least one of a bandwidth requirement, a maximum number of hops requirement, and a latency requirement.

Selecting the first host from the plurality of data center hosts to implement the first container can be based on, at least one of, security requirements of the first container, scaling requirements of the second container, and availability requirements of the first container. Selecting the second host from the plurality of data center hosts to implement the second container can be based on, at least one, of security requirements of the second container, scaling requirements of the second container, affinity requirements between the first container and the second container, and availability requirements of the second container.

The method can include identifying, from the plurality of containers, a third container to provision based on, at least, network requirements between the third container and the second container; and selecting a third host from the plurality of data center hosts to implement the third container based on, at least, compute requirements of the third container, network requirements between the third container and the second container, the configuration of the plurality of data center hosts, and the performance metrics of the plurality of data center hosts. Selecting the third host from the plurality of data center hosts to implement the third container can be based on, at least one of, security requirements of the third container, scaling requirements of the third container, affinity requirements between the first container, the second container and the third container, and availability requirements of the third container.

In another general aspect, a computer-implemented method can include receiving a request to provision a plurality of containers of an application across a plurality of data center hosts; identifying, from the plurality of containers, a first container to provision based on, at least, a computing resource to be used to implement the first container and network requirements between the first container and the computing resource; and selecting a first host from the plurality of data center hosts to implement the first container based, at least, on compute requirements of the first container, network requirements of the first container, configuration of the plurality of data center hosts, and performance metrics of the plurality of data center hosts. The method can also include identifying, from the plurality of containers, a second container to provision based on, at least, network requirements between the second container and the first container; and selecting a second host from the plurality of data center hosts to implement the second container based on, at least, compute requirements of the second container, network requirements between the first container and the second container, security requirements of the second container, scaling requirements of the second container, affinity requirements between the first container and the second container, availability requirements of the second container, the configuration of the plurality of data center hosts, and the performance metrics of the plurality of data center hosts.

Implementations can include one or more of the following features. For example, the computing resource to be used to implement the first container can be one of data storage and Internet access.

The first container can be a first container type, and the second container can a second container type, the second container type being different than the first container type. The first container and the second container can be a same container type.

The method can include identifying, from the plurality of containers, a third container to provision based on, at least, network requirements between the third container and the second container; and selecting a third host from the plurality of data center hosts to implement the third container based on, at least, compute requirements of the third container, network requirements of the third container, security requirements of the third container, scaling requirements of the third container, affinity requirements between the first container, the second container, and the third container, availability requirements of the third container, the configuration of the plurality of data center hosts, and the performance metrics of the plurality of data center hosts. The third container can be of a type that is different than a type of the first container and different than a type of the second container.

The performance metrics of the plurality of data center hosts can be determined dynamically.

The network requirements between the first container and the computing resource can be included in a manifest file for the first container. The network requirements between the second container and the first container can be included in a manifest file for the second container.

Selecting the first host from the plurality of data center hosts to implement the first container can be based on, at least one of, a security requirement of the first container and an availability requirement of the first container. Selecting the first host from the plurality of data center hosts to implement the first container can be based on relative weights for the compute requirements of the first container, the network requirements between the first container and the computing resource, and an availability requirement for the first container.

In another general aspect, a computer-implemented method can include receiving a request to provision an application having an N number of containers across a plurality of data center hosts. The method can further include determining respective placements for the N number of containers of the application in the plurality of data center hosts, until the respective placements for the N number of containers are determined, iteratively by: selecting, for placement, a container from unplaced containers of the N number of containers, the selecting being based on one of a locality constraint and an association with previously-placed containers of the N number of containers; identifying a set of data center hosts from the plurality of data center hosts based on compute requirements of the selected container and network requirements of the selected container; assigning a respective score to each of the data center hosts of the set of data center hosts based on one or more scoring weights for the selected container, configuration of the plurality of data center hosts, and performance metrics for the data center hosts of the identified set of data center hosts; selecting, based on the respective scores, a host from the set of data center hosts for placement of the selected container; and updating a container configuration table with provisioning information for the selected container, the provisioning information including the selected host and one or more logical network paths for the selected container; and provisioning the N number of containers on the plurality of data center hosts based on the container configuration table.

Implementations can include one or more of the following features. For example, the method can include receiving an indication of at least one of a change in the plurality of data center hosts and a change in the application; identifying one or more containers to reprovision based on the indication; and reprovisioning each of the identified one or more containers. For each of the identified one or more containers being reprovisioned, the method can include: identifying a modified set of data center hosts from the plurality of data center hosts based on the indication, compute requirements of the container being reprovisioned, and network requirements of the container being reprovisioned; assigning a respective score to each of the data center hosts of the modified set of data center hosts based on one or more scoring weights for the container being reprovisioned, configuration of the plurality of data center hosts, and performance metrics for the data center hosts of the modified set of data center hosts; selecting, based on the respective scores, a host from the modified set of data center hosts for placement of the container being reprovisioned; and updating the container configuration table with provisioning information for the container being reprovisioned, the provisioning information for the container being reprovisioned including the selected host from the modified set of data center hosts and one or more logical network paths for the container being reprovisioned.

Placing the selected container can include placing multiple instances of the selected container in the plurality of data center hosts based on at least one of a scaling requirement for the selected container and an availability requirement of the selected container.

Another aspect of the disclosure can be embodied on a computer-readable medium having recorded and embodied thereon instructions that, when executed by a processor (or processors) of a computer system (or computer systems), cause the computer system (or computer systems) to perform any of the methods disclosed herein.

Another aspect of the disclosure can be embodied in a system including one or more computing devices, wherein the one or more computing devices are configured to perform any of the methods disclosed herein.

The details of various implementations are set forth in the accompanying drawings and the description below. Other features will be apparent from the description and drawings, and from the claims.

BRIEF DESCRIPTION OF THE DRAWINGS

FIG. 4 is a diagram that illustrates a manifest file for the application and containers of the application of FIG. 3, according to an implementation.

FIGS. 9A and 9B are diagrams illustrating reprovisioning of the logical network of FIGS. 8A and 8B in response to a change in an associated data center, according to an implementation.

Like reference symbols in the various drawings indicate like elements.

DETAILED DESCRIPTION

Figure 1:
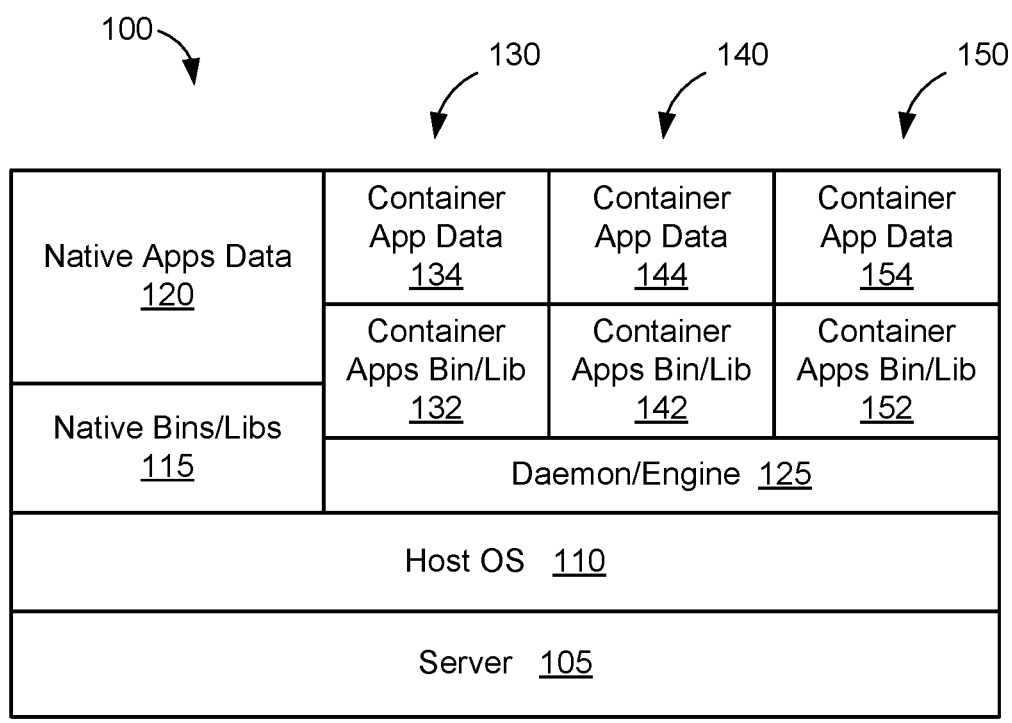
FIG. 1 is a diagram that schematically illustrates containers of an application or multiple applications implemented in a host computing device, according to an implementation.

As noted above, the advent of container technologies for implementing virtualized applications as a set of containers (which can be referred to as a "container ecosystem"), such as across a plurality of computing hosts (physical and/or virtual) implemented in a data center, or across multiple data centers, e.g., in a virtual private cloud (VPC), can provide flexibility for development and deployment of applications. However, such container technologies also present resource administration (Information Technology management) challenges. Such challenges can include initial provisioning of application stacks over a cluster of containers, initial provisioning of logical network segments between containers, security and isolation of containers, scaling of container ecosystems and modification of previously provisioned applications (ecosystems) implemented over a cluster of containers (e.g., reconfiguration of containerized applications or reconfiguration of logical networks.).

In current computing environments, such as virtualized computing environments, the majority of complex networking configuration functions are performed manually, and can require specialized expertise. Further, subsequent reconfiguration and/or scaling of such computing environments after their initial provisioning due to changes in physical, virtual, cluster, networking datacenter resources and/or in an application itself can result in downtimes and associated costs. As an illustrative example, for computing resources (services), such as virtual machines (VMs) implemented in a VPC, reconfiguration of virtual network segments that carry network traffic between the various services hosted on a given VPC can require manual administration of security groups, load balancers, perimeter firewalls, IP address pools, domain name service (DNS) servers etc. Such manual administration can be manageable for hundreds, or possibly even thousands of virtual machine (VM) instances in a given VPC. However, in computing environments that utilize container virtualization to implement an ecosystem of a very large number of containers (e.g., tens of thousands or more) hosting (implementing) applications with varying degrees of networking requirements between containers and associated SLAs (security, isolation, performance, etc.), the efficient management of computing resources (including rapid migration of containers across hosts or computing clusters) becomes untenable, as such complex container ecosystems can have network virtualization vectors that are not even representable in current approaches for computing cloud or IT automation, let alone manually manageable.

The approaches described herein can address the foregoing challenges, as they provide for automated initial provisioning of application stacks over respective clusters of containers (and corresponding virtualized network segments) with efficient use of network and computing resources, as well as achieving application and container isolation, e.g., such as per an associated service level agreement (SLA) for a given application. The approaches described herein also allow for automatic scaling of virtualized network infrastructures, as they provide for automatic scaling of applications implemented in a container ecosystem, such as scaling to satisfy availability requirements for a containerized application. Further, the approaches described herein provide for automatic reprovisioning (reconfiguration) of containerized applications that allows for automatically moving container instances (across data center hosts or across clusters, e.g., from one data center to another) and/or reconfiguring their associated virtual network segments, while maintaining efficient use of network resources and SLAs associated with the containerized applications.

For purposes of this disclosure, various terms are used to described the example implementations. In these descriptions, certain terms may be used interchangeably to refer to like aspects of the example implementations. For instance, the terms virtual and logical may be used interchangeably. As another example, the terms path, connection, segment and/or super-segment can be used interchangeably. As yet another example, the terms method and process flow can be used interchangeably.

Figure 2:
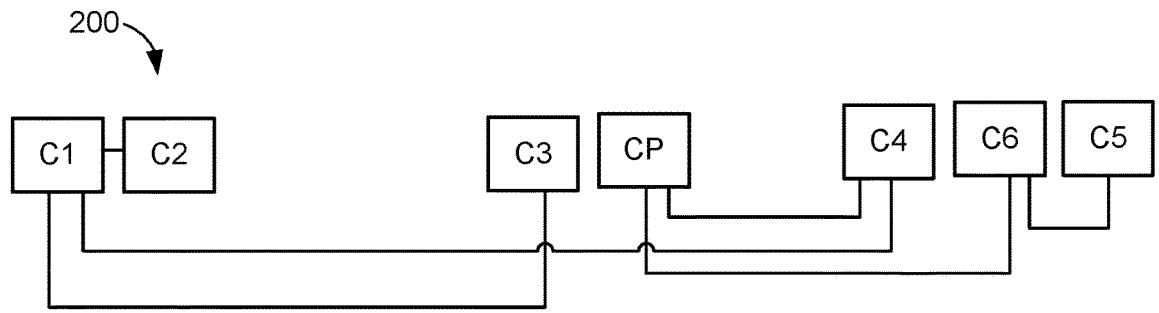
FIG. 2 is a block diagram that schematically illustrates containers of an application and connections between those containers, according to an implementation.

FIG. 1 is a diagram that schematically illustrates containers of an application (or could be multiple applications in some instances) implemented in a host computing device 100, according to an implementation. FIG. 2 is a block diagram that schematically illustrates containers of an application 200 and connections (e.g., virtual network connections) between those containers, according to an implementation. The implementations illustrated in FIGS. 1 and 2 can be implemented using the techniques described herein. The discussion of FIGS. 1 and 2 below further illustrates the administration challenges associated with the use of container technologies to implement application stacks as a group of containers across a plurality of data center resources, as well as highlighting the advantages of the approaches disclosed herein.

FIG. 1 illustrates a host computing device 100 that includes a server 105 and a host operating system (O/S) 110. The server 110 can be a physical (on-premise) resource, or can be a virtual resource, such as a server implemented as a VM. Likewise, the host O/S 110 can be an O/S running on a physical machine, or can be a virtual host O/S implemented in a VM. The host device 100 can also include native (conventional) applications (running on the host O/S 110) that include native binaries and libraries 115 and native application data 120. The host device 100 can also include a container daemon/engine 125 that is configured to manage containers implemented in the host device 100, such as using the techniques described herein.

In FIG. 1, the host device 100 also includes three containers 130, 140 and 150. In this example, the container 130 includes container application binaries and libraries 132 and container application data 134; the container 140 includes container application binaries and libraries 142 and container application data 155; and the container 150 includes container application binaries and libraries 152 and container application data 154.

In one implementation, the containers 130, 140 and 150 can be configured to implement an autonomous 3-tier application stack with a web tier (container 130) accepting incoming hypertext transfer protocol secure (HTTPS) connections on port 443, an App tier (container 140) accepting incoming HTTPS connections on port 8443 and a database (DB) tier (container 150) accepting trusted (e.g., from a pre-defined origination Internet Protocol (IP) address) connections to port 1433.

If the (horizontally scaled) containers 130, 140 and 150 (with respective internal internet protocol (IP) addresses C1, C2, C3 are only visible to the daemon/engine 125) and are to be hosted on a single host (e.g., the host device 100) with as single public IP Address A1, then an Ethernet bridge of the host device (host) 100 would need to have the following port associations with the publicly visible IP A1 created:

| | | |
|---|---|---|
| A1:p11 -> C1:43 | A1:p21 -> C2:43 | A1:p31 -> C3:43 |
| A1:p12 -> C1:843 | A1:p22 -> C2:843 | A1:p32 -> C3:843 |
| A1:p13 -> C1:1433 | A1:p23 -> C2:1433 | A1:p33 -> C3:1433 |

However, in a typical networking environment (e.g., in a VPC), associated load balancing and firewall (whether distributed or perimeter) policies would be, at most configured, for the well-known 43, 843 and 1433 ports for the public IP address A1. However, these ports can be assigned only once (e.g., p11, p12 & p13). Accordingly, to allow container virtualization of the associated application implemented by the containers 130, 140 and 150, tasks would need to be performed (manually performed) to defined the additional port configurations indicated above (e.g., for ports p21, p22, p23 & p31, p32 and p33) in all relevant load balancers instances and firewalls in the associated computing network, and also to enable/create routing table entries if, and when, the containers 130, 140 and 150 talk to each other. Other potential configuration tasks may also be needed depending on the specific implementation.

As container technologies are gaining prevalence due their ability to scale and allow for mobility of containers (and clusters of containers), it is unlikely these foregoing configuration operations (or similar operations) would only be performed during an initial provisioning of the containers 130, 140 and 150, and could need to be performed again as the associated container ecosystems scales and/or changes occur in a host used to implement the containers 130, 140 and 150 and/or changes occur in the associated application. Accordingly, manual reconfiguration, or even a policy driven network reconfiguration would be extremely inefficient. Further, considering the potential rapid growth of a container ecosystem that includes the containers 130, 140 and 150, such management and configuration approaches become clearly untenable.

Referring to FIG. 2, an application 200 implemented as a cluster of P containers: containers C1, C2, . . . CP, with logical (virtual) network paths shown between the various containers is illustrated. As discussed in further detail below, network requirements (specifications, parameters, etc.) such as gigabits per second (Gbps), latency, number of hops or other SLA requirements for this communication can be specified in one or more manifest files (e.g., an application manifest file and/or separate, respective manifest files for each container). Security requirements can also be specified in such manifest files. For instance, one security requirement may be that container C5 can connect to container C6, as well as additional isolation requirements.

In some implementations, there is isolation between apps and/or between containers within an app by default, unless otherwise declared (e.g., in an associated manifest file or files). Accordingly, in such approaches, no two containers (containers of different applications, or of the same application) implemented across a common set of resources (e.g., within a given data center or data center host) can have any visibility of (access to) each other's containers, unless such access is specifically declared. For instance, continuing with the example of containers C5 and C6 above, a manifest file for the application 200 (or manifest files for containers C5 and/or C6) could declaratively specify a security requirement that container C5 can connect to container C6.

As can be deduced with reference to FIG. 2, logical network paths between containers can become highly complex and intricate, especially when the number of containers scales, such as to 1000-10,000 containers for a single containerized application. Accordingly, automation of the process of provisioning and reprovisioning these logical network paths between containers and hosts on which the containers are provisioned using the approaches described herein is advantageous over manual approaches that are currently used.

Furthermore, when implementing a container ecosystem across more than one host, such as across a large collection of hosts sharing a same underlying network fabric (e.g., a virtual network fabric), logical virtualization of resources (computing and network) both at the beginning of the containerization process, as well as in subsequent configuration steps for scaling, reconfiguration due to change events, migration upon redundancy failures, etc. can become practically impossible to accomplish manually, or even through predictive policy mechanisms. Accordingly, the automated container provisioning and reprovisioning approaches described herein offer a desirable solution. Such approaches not only allow for automated initial deployment of a logical networking topology for a container ecosystem, but also allow for continuously tuning and managing that topology to ensure compliance with application SLAs by taking underlying computing resource and networking resource specifications (requirements), as well as changes in performance, health, security and availability metrics, and/or topology of available computing and networking resources (physical and/or virtual) into account.

Additionally, the use of container clustering platforms, which can make container ecosystems even more dynamic and scalable, can increase the complexity of the administration problems noted above by a orders of magnitude, not only in terms of initial configuration but in scaling and migration of containers (clusters of containers) between computing hosts and/or between data centers (e.g., between hosts implemented in a VPC).

Also, in some implementations, due to heterogeneity of underlying physical networking devices as well as computing clusters that can be used to implement containerized applications, it is desirable that approaches for automatically provisioning and reprovisioning (reconfiguring) containerized applications account for such heterogeneity (e.g. be gear-heterogeneous), as well as be agnostic to structure of a given internal cloud and/or external cloud to which the data center hosting such a container ecosystem can expand to. In other words the managed network virtualization segments and super-segments of a container ecosystem can span across clouds and are typically gear-heterogeneous even inside a single physical data center. Accordingly, approaches for provisioning container ecosystems should be capable of operating in such environments.

The methods (process flows), systems and techniques described herein address the problems and concerns noted above. For instance, these methods, systems and techniques are able to automatically create logical networking virtualized environments and their corresponding (virtual) topology at service-container ecosystem initiation time (e.g., container deployment and initial provisioning). The disclosed methods, systems and techniques provide for efficient use of network resources (including compute resources) while ensuring compliance with application SLAs. The disclosed methods, systems and techniques also provide for automatically mutating and expanding such container ecosystem environments, including network segments within them in response to changes (change events such as scaling changes in a given application or a data center implementing the containerized application), migration of containers and/or redeployment events in the container ecosystem. The described methods, systems and techniques are also independent of: a) networking device specifics; b) internal or external cloud configuration (including the cloud-burst use case; c) compute virtualization/clustering platforms; and d) container virtualization/clustering platforms.

The disclosed methods, systems and techniques can solve the above noted problems by, at least in part, automatically and dynamically provisioning, configuring, reprovisioning and/or reconfiguring logical networks segments and super-segments for application stacks based on: application networking resource requirements (e.g., bandwidth, throughput, a maximum number of hops (network hops, virtual network hops, logical hops, etc.) between containers, and/or latency between containers); an underlying datacenter's network fabric topology, and the underlying data center network's run-time performance/usage metrics. Compute requirements for containers of an application being provisioned or reprovisioned can also be taken into account, where such compute requirements can be specified as a compute capacity requirement (e.g., a number of processors (CPUs) or processing capacity) and a storage requirement (e.g., gigabytes of storage). Still further, other requirements (e.g., high availability (HA), security, etc.) can be taken into account, as can, as noted above, the underlying datacenter's compute infrastructure run-time performance/usage metrics, which can be monitored and collected in real time.

The methods, systems and techniques described herein automate provisioning and network creation for a cluster of application containers, such that a respective logical network can be automatically derived, provisioned and configured for containers for each application that is provisioned based on, at least, a) a specification of network resource requirements between each pair of connected containers and between external entities and containers and b) performance metrics from the existing network topology through a performance monitoring tool. In this manner, the administrative burden related to these networks is vastly reduced. Specifying network requirements such as bandwidth, messages per second, hops and latency in the application blueprint allows such a provisioning system to intelligently place the containers of a given application stack over a given network fabric, as well as to dynamically perform network scaling and network reconfiguration when one or more containers of the application stack of containers is moved, requirements of the application change, and/or if there is a change (adverse change or degradation) in performance of computing hosts implementing containers of an application or in performance of network segments connecting containers of an application.

Figure 3:
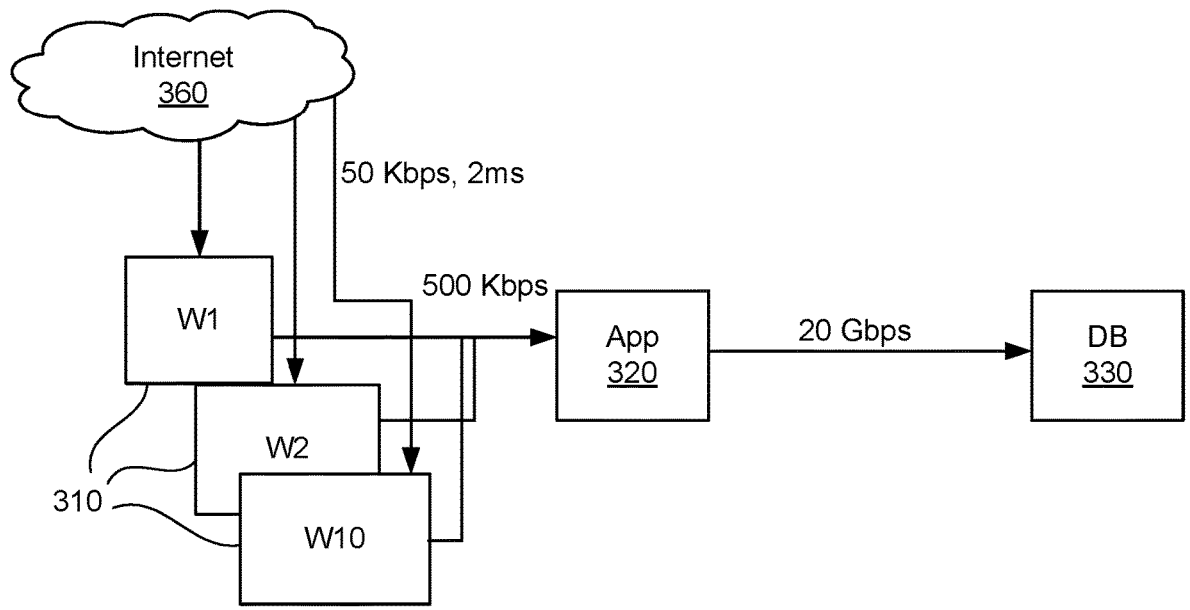
FIG. 3 is a block diagram that illustrates a three-tier containerized application, according to an implementation.

FIG. 3 is a block diagram that illustrates an example three-tier containerized application 300, according to an implementation. FIG. 4 is a diagram that illustrates a corresponding manifest file 400 for the application 300 and containers of the application of FIG. 3, according to an implementation. The containerized application 300 and associated manifest file 400 are given by way of example and for purposes of illustration, and are referenced in describing the container-based system 500 of FIG. 5, the associated process flow (method) 600 of FIG. 6 and the example of initial provisioning of containers and associated virtual network segments between those containers shown in FIG. 7. In other implementations, each container type of a given application could have a separate manifest files, additional or fewer requirements could be specified for each container, additional or fewer container types could be included, etc. The example of FIGS. 3 and 4 is, again, provided by way of example, and for purposes of illustration of the disclosed systems, methods and techniques.

As shown in the block diagram of the application 300 in FIG. 3, and in the associated manifest file 400 in FIG. 4, the application 300 includes three types of containers: Webserver containers 310 (W1 . . . W10), an application server (Appserver or App) container 320 and a database server (Dbserver or DB) container 330. The manifest file 400 includes a title portion 405, a Webserver portion 410, an Appserver portion 420, a Dbserver portion 430, and scoring weights 440 (which can be used when selecting computing and networking resources, as discussed below). The manifest file 400 also includes connection portions 450, 460, 470, which provide (specify) logical network resource requirements (network requirements) for connections between containers for the application 300. These connection details (network requirements) are also shown in FIG. 3, by the illustrated connections between the containers of the application 300, and by the indicated network requirements for each specific connection between containers.

The respective portions of the manifest file 400 corresponding with each container, e.g., the Webserver portion 410, the Appserver portion 420, the Dbserver portion 430 each includes an image specification, that can include respective pointers to (executable) images for each container. Also in the Webserver portion 410 of the manifest file 400, a scale of 10 is listed and an AvailabilityZones requirement of 2 is specified, indicating that the provisioned application 300 should include 10 instances of the Webserver 310 that are to be divided across two availability zones (e.g., 5 in each zone) of an associated computing resource network. In the manifest file 400, there are also security requirements specified for the Webserver containers 310 and the Dbserver container 330, as well as a data source for the Dbserver container, which is expressed, in this example, as file:/var/lib/database. The manifest file 400 also includes a network scaling requirement for the Webserver containers 310 of the application 300, which is expressed as "scaling: if bw>500 and <1000, scale-up, if bw>1000, scale-out." If any of the conditions of this scaling requirement are met while executing the application 300, a change event (such as are discussed herein) can be indicated, and reprovisioning of the virtualized network for the application 300 can be triggered, where such reprovisioning can be affected using the process flow illustrated in FIG. 6.

As shown in FIG. 4, the manifest file 400 further includes compute resource requirements for each container type of the application 300. As shown in the manifest file 400, the Webserver container type 310 has a compute resource requirement of 10 CPU and 5 GB of memory, the Appserver container type 320 has a compute resource requirement of 50 CPU and 8 GB of memory and the Dbserver container type 330 has a compute resource requirement of 90 CPU and 16 GB of memory. The specifics of these CPU and/or memory requirements and how they are implemented in the application 300 can depend on the specific implementation, such as the specific container technology that is used to virtualize the application 300.

As indicated above, network path resource requirements for network resources between the containers of the application 300 are specified in the connection sections 450, 460 and 470 of the manifest file 400. In the connection section 450, the network resource requirement for each Webserver container 310 is specified as 50 kilobits per second (Kbps) in both directions with the public Internet. In the connection section 460, the network resource requirement for the Appserver container 320 is specified as 500 Kbps with the Webserver containers 310 (which can be an aggregate requirement, e.g., 50 Kbps per Webserver container). In the connection section 470, the network resource requirement for the Dbserver container 330 is specified as 20 gigabits per second (Gbps) with the Appserver container 320. These connection (network) requirements specify the expected "network usage" between the containers within the application 300. It is noted that, in this example implementation, only the Appserver container 320 can connect to the Dbserver container 330, while, implicitly, all other containers cannot connect to Dbserver container 330 and are used in the approaches described herein when provisioning (or reprovisioning) the containers and corresponding network segments of the application 300, which has the structure (virtual) structure illustrated in FIG. 3 once provisioned.

In implementations, using the approaches described herein, affinity rules (relating containers of an application) can be automatically derived from container portions of a manifest file, or from separate container manifest files. Said another way, meta-data (in manifest files) for the containers of a given application can be used to automatically derive affinity rules for related containers.

As an example of a generated affinity rule, a manifest file or manifest files for a given containerized application may indicate (e.g., with corresponding meta-data) that multiple containers share a "resource" such as a data file, filesystem or IP address. Based on such a determination, the manifest file(s) for the application can be automatically enriched by automatically generating an affinity rule specifying that such containers (e.g., containers that share a given resource) should be provisioned (placed) on a same host device that provides, or is in close proximity with, that shared service or resource. As another example, multiple containers with specific availability and/or scaling requirements can have their respective manifests enriched with corresponding (automatically generated) affinity rules that are based on defined (e.g., predefined, dynamically determined, etc.) data center fault regions. As an example, for the application 300, the Webserver containers 310 (e.g., W1 . . . W10) are specified as having an AvailabilityZone requirement of two (2) availability (fault) zones or region. In this example, affinity rules to two different data center regions can be automatically generated. For instance, W1 . . . W5 can be specified (in an automatically generated affinity rule) as having affinity to a first data center fault region, while W6 . . . W10 can be specified (in an automatically generated affinity rule) as having affinity to as second (different) data center fault region. Such affinity rules could be expressed as:

Affinity({HostR11 . . . HostR1N}, {W1 . . . W5})
Affinity({HostR21 . . . HostR2N}, {W6 . . . W10}), where there an associated data center in which the Webserver containers 310 are be placed (and subsequently provisioned, has two data center fault regions (R1 and R2), which each of the data center fault regions R1 and R2 each containing N hosts in this example.

In an example implementation, two containers of a given application can have a volumes-from relationship specified in their manifest file(s). This information can be used to automatically derive an affinity rule that the two containers be placed on the same host since they share a volume. For example, two database containers (such as multiple instances of the Dbserver container 330) can be specified as sharing a volume file:/var/lib/sharedDB. This information can then be used to automatically derive a corresponding host affinity rule for the two instances of this container, in this example a first container data1 and a second container data2. An affinity rule resulting from this volumes-from relationship could be expressed as, for instance:

Affinity(Host, data1, data2)

In another example, the manifest file (metadata) for a given container, such as the Dbserver container 330 of the application 300, may specify that it uses a mounted file system data volume. In such instances, an affinity rule that the Dbserver container 300 be started on a specific host where the mounted file system data volume is persisted can be automatically generated based on the container manifest (metadata) for this container. In this example, if the mounted file system data volume is persisted on Host-S, a corresponding affinity rule for the Dbserver container could be expressed as:

Affinity(Host, Dbserver, Host-S)

As yet another example, metadata (manifest files) for containers of an application can specify that multiple containers share a given IP address. In this instance, the metadata (e.g., manifest file or files) for the application can be automatically enriched by automatically generating an affinity rule indicating that containers sharing the given IP address each be placed on a host serving that shared IP address.

Figure 5:
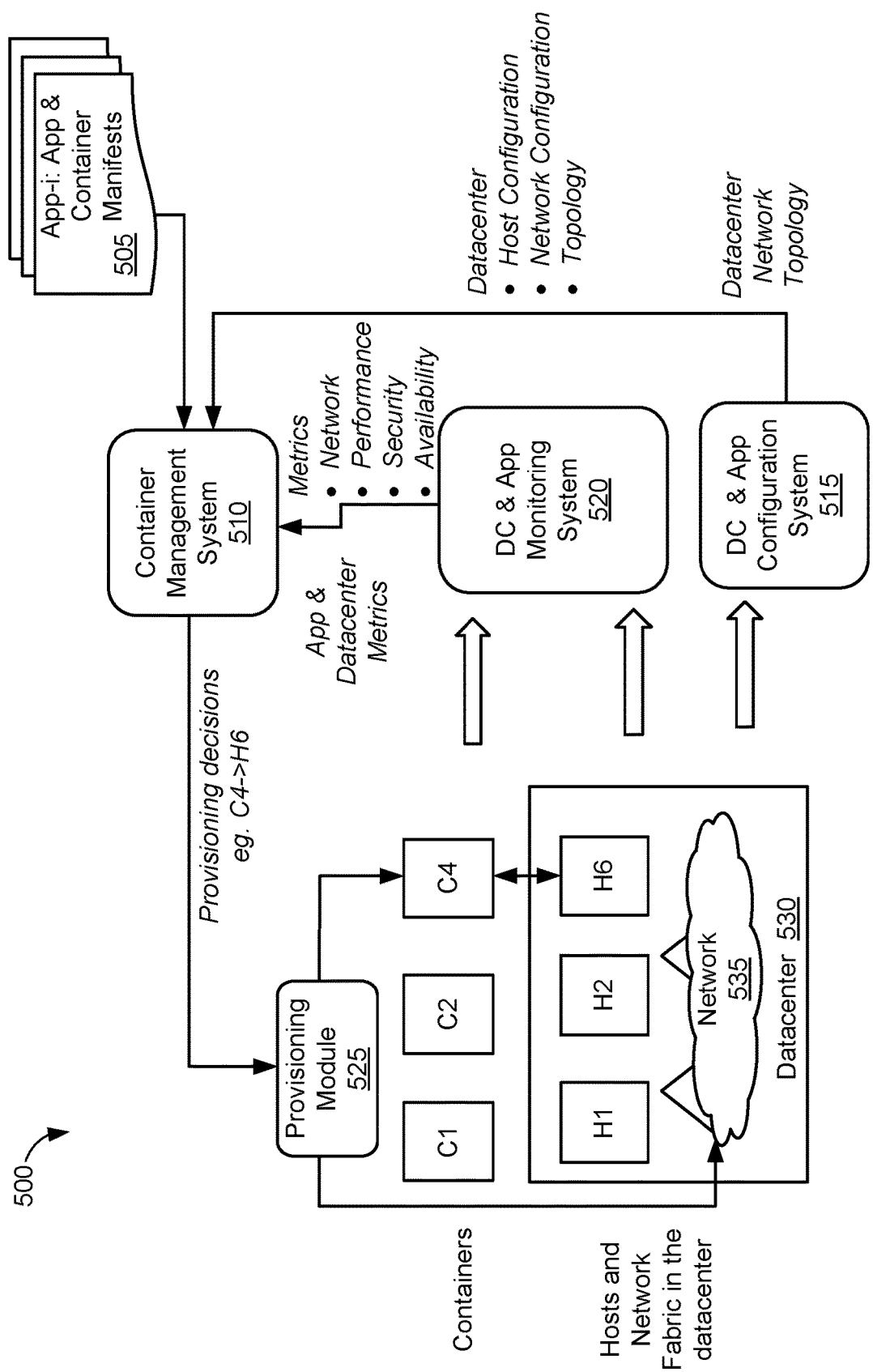
FIG. 5 is a block diagram illustrating a system for container provisioning (including reprovisioning), according to an implementation.

FIG. 5 is a block diagram illustrating a system 500 for container provisioning (including reprovisioning) for containerized applications, according to an implementation. For example, the system 500 can implement the process flow of FIG. 6 using the various techniques and approaches described herein. As shown in FIG. 5, the system 500 includes an application 505 to be provisioned, where the application 505 can include containers of the application and one or more manifest files, such as the manifest file 400 discussed above. In some implementations, the application 505 can include an application manifest file and separate container manifest files for each container of the application 505. The system 500 also includes a container management system 510, that can be configured to perform provisioning and reprovisioning of the application 505 (e.g., in accordance with the process flow of FIG. 6) in cooperation with other elements of the system 500.

For instance, the system 500 of FIG. 5 also includes a data center and application configuration system 515, a data center and application monitoring system 520, a provisioning module 525 and a data center 530. The data center and application configuration system 515 can maintain configuration information for the data center 530 and the provisioned application 505. This configuration information can be updated to reflect configuration changes in the data center 530 and in the provisioned application 505. For instance, the data center and application configuration system 515 can include predefined configuration information for the data center 530 and initial provisioning information for the application 505, where this information can be updated based on monitoring of the data center by the data center and the application monitoring system 520, such as to reflect changes in performance metrics of components of the data center 530, scaling of the application 505, modifications to the application 505 based on changes in an SLA for the application, etc. The container management system 510 can provision or reprovision containers of the application 505 (and corresponding logical network segments) for implementation in the data center 530 based on, at least, the manifest files of the application 505 and information provided by the data center and application configuration system 515 and the data center and application monitoring system 520. Such provisioning and reprovisioning can be performed, for example, by the provisioning module 510 (using placement and configuration decisions made by the container management system 510) in accordance with the process flow of FIG. 6.

In the example system 500 of FIG. 5, three containers C1, C2 and C4 of the application 505 are shown, with the container C4 being shown as being provisioned a host H6 (of hosts H1, H2 and H6 of the data center 530). The application 505 can, of course include many more containers. As also shown in FIG. 5, the data center 530 can include an underlying data network 535, which can be provisioned to implement virtual (logical) network segments between the containers C1, C2 and C4 as part of provisioning the application 505. Examples of provisioning and provisioning such logical network segments are discussed further below, such as with respect to FIGS. 8A-10B.

In provisioning the application 505, the system 500 can utilize (implement) the various techniques and approaches described herein. For instance, such techniques and approaches can include declaratively defining (e.g., in manifest files) or deriving (e.g., as affinity rules) network characteristics of the application stack (set of containers) of the application 505, which can be considered (e.g., by the container management system 510) in combination with computing requirements and/or scaling requirements (which can also be specified in manifest files (metadata) for the containers of the application 505). Such network characteristics can include logical network resource requirements between containers (e.g., specified in manifest files) and logical network scaling requirements (e.g., specified in manifest files) that are also provisioned based on network performance metrics (e.g., from the data center and application configuration system 515 and/or the data center and application monitoring system 520).

The system 500 can be configured to provision the application 505 (as well as other containerized applications) based network topology of resources included the data center 530 (which can include a set of resources implemented in a VPC), performance metrics of the data center 530's resources and fault domains defined in data center 520. For instance the data center 530's network topology and performance metrics can be declaratively defined in the data center and application configuration system 515 and/or can be dynamically discovered by the data center and application data center monitoring system 520. Such network topology and network performance metrics can be declaratively defined and/or dynamically determined for connections (network fabric elements) between all network entities of the data center 530 (e.g., hosts-to-hosts, hosts-to-switches, switches-switches, . . . etc.), which can also include fault boundaries in the data center 520 that identify hierarchical availability zones, such as the availability zones illustrated in FIG. 7.

Figure 7:
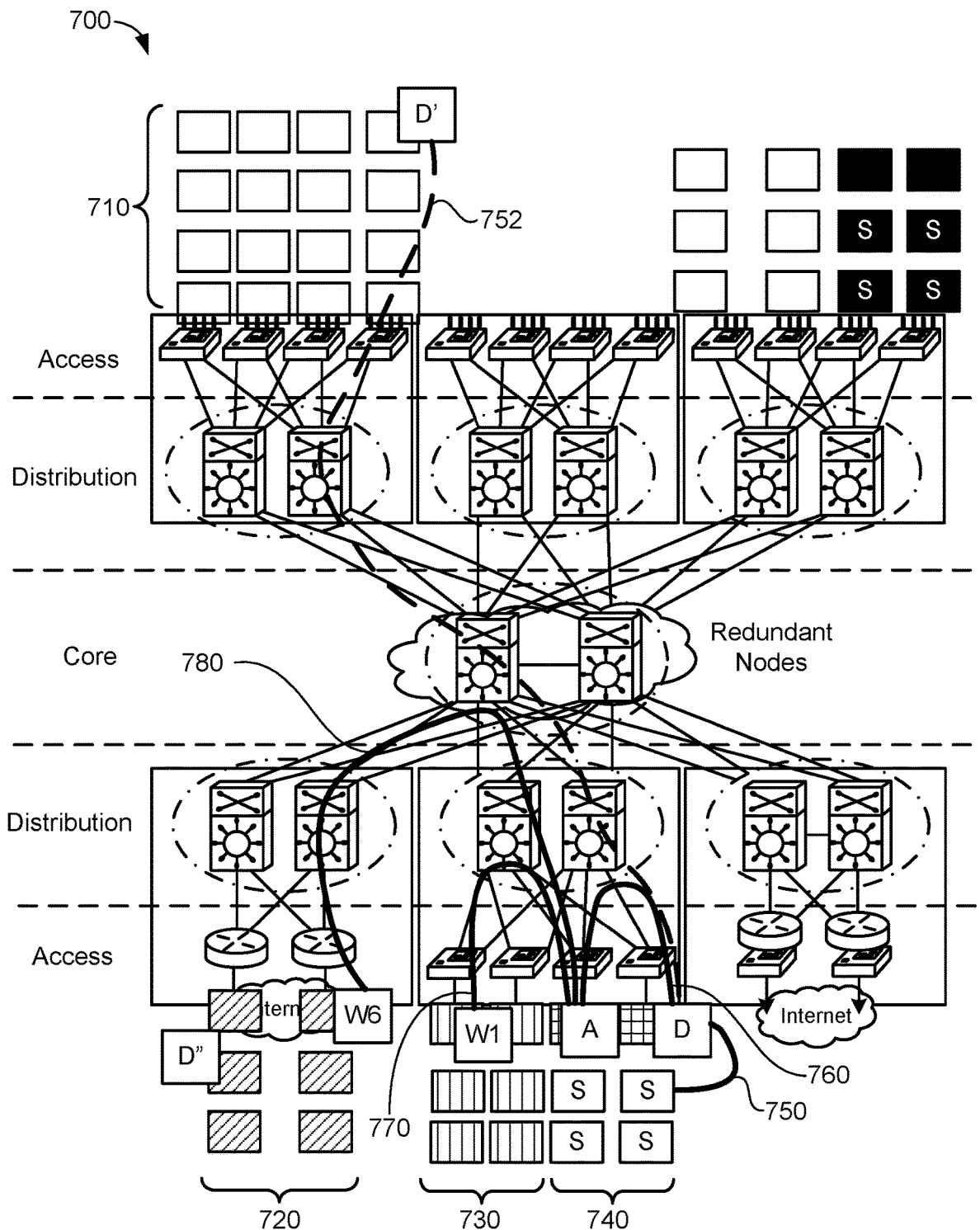
FIG. 7 is a diagram illustrating placement of containers in a data center including a plurality of hosts, according to an implementation.

As shown in FIG. 5, the data center 530 can include a collection (plurality) of compute nodes (hosts, data center hosts) H1-H6, in this example, where each data center host can having specified CPU capacity, (volatile) memory capacity and (non-volatile) disk capacity that can be provisioned and used by containers of one or more containerized applications. The data center, in other implementations, can include additional hosts, additional data networks, etc. In the data center 530, a given compute node (data center host) can host many containers of one to many applications. In certain implementations, some of the compute nodes (hosts) can be declaratively defined and/or discovered as only being available to host storage services, such as for a storage area network (SAN), due to their proximity to data storage resources in the data center 530, such as proximity to hard disk arrays or farms. Further in the system 500, compute nodes of the data center 530 can be operatively connected with each other through a data center network topology (e.g., the network 535), which can include a number of devices, such as switches and routers. An example of such a network of connections between hosts is shown in FIG. 7.

The data center and application monitoring system 520 of the system 500 can be configured to dynamically monitor and measure network, security, availability and/or health metrics of the data center 530, such as overall bandwidth and network usage (e.g., for all hosted applications), as well as dynamically monitor and measure application performance metrics for the application 505, such as traffic between containers of the application 505. The results of the monitoring by the data center and application monitoring system 520 can be used to dynamically update the network characteristics of the data center 530 (e.g., as maintained by the data center and application configuration system 515) based on the observed metrics between containers of applications hosted in the data center 530, such as traffic flow metrics including container-to-container latency and/or security metrics for hosts and networks . . . Accordingly, the data center and application monitoring system 520 can provide real-time values for network metrics, such as measures of traffic between any two end points on the data center 530 such as Host-to-Host, Host-to-Switch, Switch-to-Switch, etc.

Metrics (real-time measurements) determined by the data center and application monitoring system 520 can allow for improved container placement decisions and associated virtual network segment configurations by the container management system 510, as such decisions can be made based on dynamically obtained information, rather than preconfigured network metrics from an initial datacenter declaration, or from previously obtained and/or outdated metrics. For instance, the container management system 510 can, using information from the manifest(s) of the application 505 (including derived affinity rules), information from the data center and application configuration system 515 and/or information from the data center and application monitoring system 520, make intelligent container placement and network segment configuration decisions for the application 505 (and other containerized applications).

Figure 6:
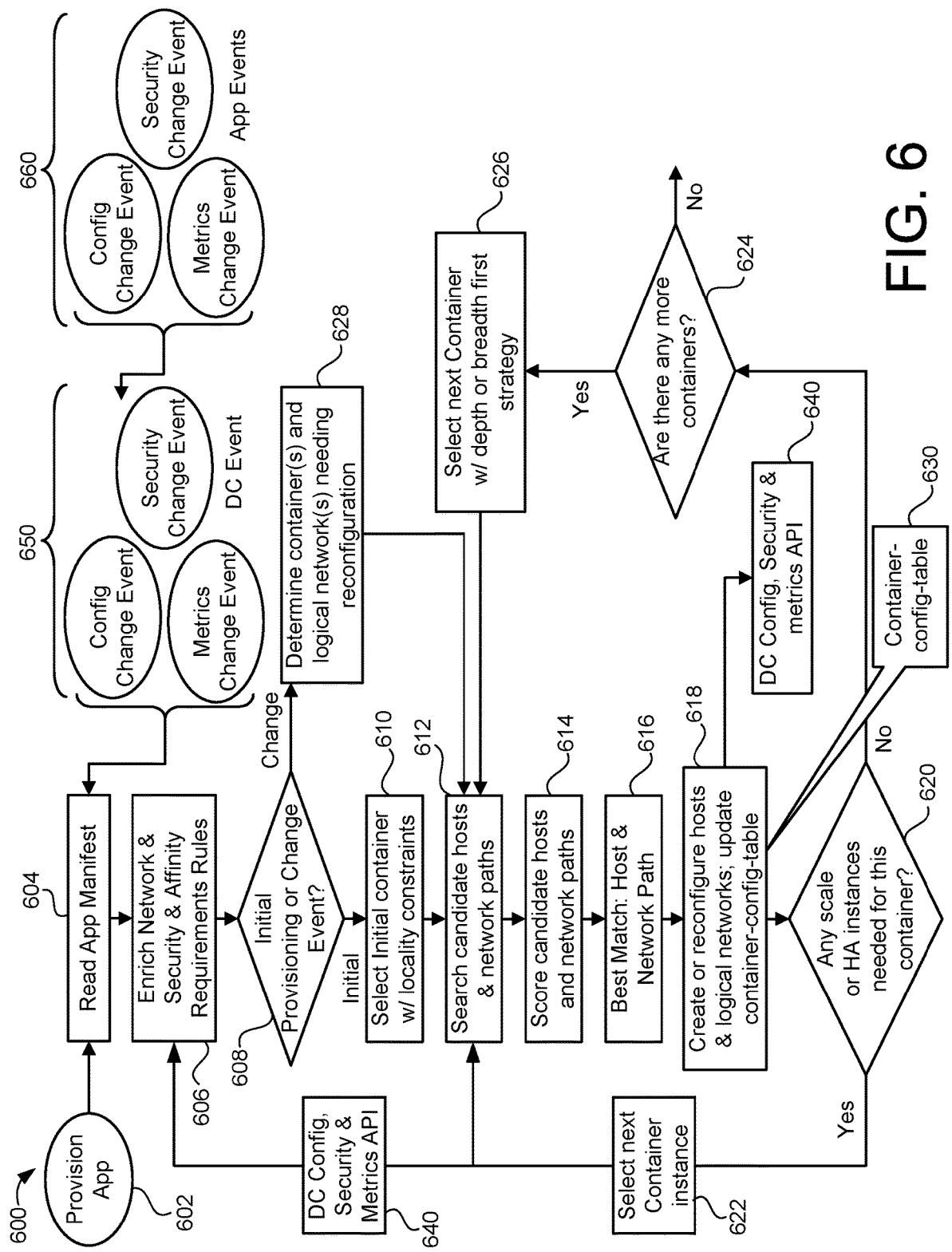
FIG. 6 is a flowchart illustrating a process flow (method) for container provisioning and reprovisioning, according to an implementation.

FIG. 6 is a flowchart illustrating a process flow (method) 600 for container provisioning and reprovisioning, according to an implementation. In an implementation, the process flow 600 can be implemented by the system 500 of FIG. 5.

FIG. 7 is a diagram illustrating placement of containers in a data center 700 including a plurality of hosts, according to an implementation, which can be accomplished using the system 500 and the process flow 600. FIGS. 6 and 7 are each described generally below, with reference to the application 300 of FIG. 3, the manifest file 400 of FIG. 4, and the system 500 of FIG. 5. After the general discussion of FIGS. 6 and 7, an example of the placement of containers of the application 300 in the data center 700 will be discussed, with further reference to FIGS. 4-6.

Referring to FIG. 6, the process flow 600 can be initiated in multiple ways. For instance, at block 610, a request (an initial request) to provision a containerized application across a set of computing resources (e.g., a data center, etc.) can be received. In another instances, a change event can occur that initiates performance of the method 600 to reprovision (reconfigure, etc.) a previously provisioned containerized application, which can include migrating containers (e.g., from one host to another host) and/or reconfiguring logical network segments between containers. Such change events can include data center (DC) events 650 and/or application (App) events 660. The DC events 650 can include changes in configuration of a corresponding data center (e.g., the data center 700 in this example), changes in performance metrics in the data center 700 and/or changes in security of components of the data center, such as detected vulnerability to malicious software attacks. Similarly, the App events 660 can include changes in configuration of an application (e.g., of containers of the application 300), changes in required metrics of the application and its containers, and/or changes in security requirements of the application.

After initiation of the process flow 600 (from block 610 or change events 650, 660), the process flow 600 continues to block 604 and a manifest of the application (e.g., the manifest file 400 of the application 300) can be read (e.g., by the container management system 510 of the system 500). For purposes of clarity and illustration, in the following discussion of FIGS. 6 and 7, it is presumed that the container management system 510 performs the operations of block 604-628 of the method 600. However, in certain implementations, other components of the system 500 (or other system could perform these operations), additional components that perform such functions can be included in the system 500, and so forth.

At block 606, the manifest file(s) of the application being provisioned or reprovisioned can be enriched by automatically generating affinity rules, such as discussed herein, which can enrich network requirements, security requirements, availability requirements, etc. At block 608, a determination can be made whether the process flow 600 is being performed based on an initial provisioning request, or in response to change event. If the process flow 600 is being performed to initially provision an application, the process flow 600 moves to block 610, where an initial container of the application is selected for placement on a data center resource. At block 610, the container selection can be based on a locality restraint, such as are discussed herein. If, however, the process flow 600 is being performed in response to a change event, the process flow 600 moves from block 608 to block 628, where a determination of the containers of the application and/or the logical network connections that need to be reconfigured (changed, reprovisioned, migrated, moved, etc.) in response to the given change event 650 or 660 is made.

From blocks 610 and 628, performance of the process flow 600 moves to block 612, where the remainder of the operations 612-626 of the process flow 600 can be iteratively performed to accomplish initial configuration of a containerized application or reprovisioning of a containerized application. At block 612, a search of available hosts can be performed to determine a list of candidate hosts in an associated data center and associated network paths that satisfy the specified and/or enriched requirements (network, security, affinity, availability, etc.) of the container being placed. At block 614, each candidate host in the data center and/or corresponding network path is scored (e.g., using a heuristic formula based on scoring weights in the manifest file) to determine the best candidate host for the container being placed. An example of such a formula is provided below.

At block 618, the current container is placed on the selected host (e.g., in a network map) and logical network connections for the container are configured (e.g., in the network map). A container configuration table 630 can be updated at block 618 to reflect placement of the container and configuration of the associated network connections (e.g., to build and/or modify the network map for the application). Further, a data center configuration, security and metrics API 640 (which could be included in the data center and application monitoring system 520) can detect (e.g., be provided with) the configuration (provisioning) information from block 618 to dynamically update data center configuration information, and also be enable to monitor container performance and security metrics (using the information in the container configuration table). As shown in FIG. 6, the data center configuration, security and metrics API 640 can also trigger enrichment of network requirements (e.g., such as scaling), security requirements and affinity requirements at block 606.

At block 620, a determination is made whether there any (high) availability (HA) and/or scaling requirements for the container that was placed at block 618 that indicate that additional instances of the container should be placed. If it is determined, at block 618, that additional instances should be placed, a next container instance to be placed (e.g., to meet the scaling and/or HA requirements) is selected at block 622, and the process flow 600 returns to block 612 to commence placement of the current container's next instance that was selected (identified) at block 622.

If it is determined, at block 620, that there are no scaling and/or HA requirements (or additional scaling or HA instances) to be placed, the process flow moves to block 624 and a determination of whether additional containers of the application need to be provisioned or reprovisioned is made. It is noted that reprovisioning a container can include migrating the container from one host to another host and/or reconfiguring the logical network connections (paths, segments, etc.) associated with the container. The specific operations performed will depend on the specific situation, such as the details of a change event that triggers performance of the process flow 600 (e.g., to reprovision a given containerized application). If it is determined, at block 624, that there are additional containers to be placed, the process flow 700 moves to block 626 and a next container for placement is selected. The selection at block 626 can be either a depth first or a breadth first selection, based on an association (e.g., affinity) with one or more previously placed containers, and so on, which selection will depend on the particular implementation. After the selection at block 626, the process flow 600 returns to block 612 for placement of the container selected at block 626.

If it is determined, at block 624, that all containers of the application are placed (initially placed or reconfigured in response to a change event), the process flow 600 ends. If implemented in the system 500, in response to a determination at block 624 that all containers have been placed, the container management system 510 can provide the container configuration table 630 to the provisioning module 525, and the provisioning module 525 can then provision (or reprovision) resources in the data center 530 based on the container configuration map 630 (e.g., provision the containers of the application and their corresponding logical network connections in the data center 530) based on the container configuration table 630, or changes made in the table, that results, or result from the performance of the process flow 600.

FIG. 7, as was noted above, is a diagram that illustrates an example of placing containers of the application 300 of FIG. 3 in an example data center 700. The specifics of the data center 700 are not described herein, though reference is made to the components of the data center 700 with respect to illustrating the approaches for provisioning and reprovisioning containerized applications described herein.

Generally, the data center 700 includes a plurality of hosts, that are represented by square boxes (with various shadings in FIG. 7), as well as a number of other devices (switches, routers, etc.). The hosts can be servers (physical and/or virtual) that are connected by a hierarchical network of access, distribution and core switches. Each of these hosts can have a switch (e.g., a vSwitch or open vSwitch) that provides a bridge within the host for it to run (host), for example, 1000-2000 containers. The hosts can also include a top-of-rack (TOR) access switch. Hosts provide data storage in the data center 700 are represented by an "S" in FIG. 7.

In the data center 700, the hosts are divided among (distributed across, etc.) four availability zones 710, 720, 730 and 740. Each host can have specified properties (e.g., that are maintained by the data center and application and configuration system 515 of the system 500) that represent a list of failure or availability zones it belongs to. For example, typical fault domains (regions, availability zones, etc.) can be defined by region/access zone/rack/host. For instance, a rack availability zone (AZ) can be defined as consisting of all hosts within a rack connected to a given TOR switch. An access AZ can be defined as all the racks connected to an access switch, and so on. While the hosts in FIG. 7 are shown as each only belonging to a single AZ, in other implementations, a given host can belong to one or more such AZs. It is noted that such AZs can be preconfigured (e.g., as part of the initial network topology information), where this information is used for spreading (placing) containers in accordance with availability zone requirements using the approaches described herein.

The approaches described herein, such as the process flow 600, allow for intelligent placement of containers of a containerized application on hosts of a data center, where such placement takes data center topology and network metrics (e.g., dynamically monitored and/or determined) into account when placing the containers and ensures that compute, network, security, HA, and policy based requirements of the containerized application (e.g., from manifest files and/or automatically generated affinity rules) are met.

An example of using these approaches to initially place (initially provision) the containers of the application 300 and their corresponding logical network connections is described below. As was noted above, this example will be described with reference to FIGS. 3-7. This example illustrates that placing containers of an application and configuring corresponding (logical) network paths using the approaches described herein can allow for automatic container placements and associated logical network segment configurations that meet network and applications SLAs, network requirements and network resource utilization, while ensuring that non-network requirements are met. Examples of reprovisioning placement of containers and/or reconfiguring associated logical network connections are described below with respect to FIGS. 8A-10B.

Placement of the containers of the application 300, using the process flow 600, can begin, at block 602, with, at least, the container images of the application 300 and the manifest file 400 (e.g., collectively the containerized application) being provided to the system 500 (e.g., in place of the application 505). As noted above, container placement (e.g., in accordance with the process flow 600) can be implemented by following a depth first or a breadth first walk on the network paths specified for the application 300 in the manifest file 400 (and described above), where placement can start from one of the end of three-tier structure of the application 300, where the end container selected (at block 610) is based on a locality requirement of a resource or service used by the container, such as data storage or Internet connectivity, as two examples.

At block 604, the manifest 400, affinity rules can be automatically generated at block 606 and a determination can be made at block 608 that this an initial provisioning for the containers of the application 300. At block 610 a determination of the first container to be placed can be made based on containers that have a function that depends on data locality or (public) Internet locality for access to by a host on which the container is place. In this example the Dbserver container 330 can be selected based its data locality requirement. Placement of the container and configuration of associated logical network connections (e.g., to a storage resource) can then be accomplished by performing operations 612 to 618.

Selection of the initial container to be placed at block 608 can be based on the following considerations. For instance, data and Internet sources are generally fixed in a data center's fabric. Accordingly, containers that provide database functionality or Internet service can have fixed access points in the data center 700 of FIG. 7. As an example, data storage hosts are represented as S in FIG. 7. In implementations, these hosts could be implemented using magnetic or optical storage devices, solid state drives (SSD), and/or storage arrays that are fixed in their location in the data center 700's fabric. Accordingly, in this example, the container management system 510 can, at block 618, determine whether there are any containers of the application 300 that specify data or Internet access requirements and/or that have a high network requirement for data access. In our example, the operation at block 618 can identify the Dbserver container 300, based on its storage requirement and/or its bandwidth requirements for providing data storage access (e.g., the bandwidth requirement of 20 Gbps with the Appserver container 320).

At block 618, a determination that there are not any additional instances of the Dbserver container 330 to be placed can be made, e.g., based on availability requirements (e.g., one AZ) and the lack of a scaling requirement in the manifest file 400. At block 624, a determination can be made that additional containers (e.g., the Appserver container 320 and the Webserver containers 310) of the application 300 still need to be placed.

At block 626, a determination of the next container (e.g., the Appserver container 320) to be placed can be made, e.g., based on the connectivity of the Appserver container 320 to the Dbserver container 330, e.g., based on the network resource requirement (e.g., 20 Gbps) between the Appserver container 320 and the Dbserver container 330. In other words, each time a container is selected for placement, network resource requirements for containers to the already placed containers can be compared, while other non-network resource requirements such as compute requirements, HA requirements, etc. can also be considered. Affinity rules, scoring rules and network path minimization rules, such as described herein, can be evaluated to efficiently select hosts for placement of each container or set of containers (e.g., scaled instances and/or availability instances). As noted above, this process flow iteratively ends after all the containers of an application are placed to a set of hosts, and associated logical network paths are configured which can be included in a container configuration table 630 that acts a plan for the provisioning of the application in the associated data center. This plan of container-to-host mapping and network paths between containers (e.g., the container configuration table 630) can then be given to the provisioning module 525 to execute (perform) provisioning of the containers of the application 300 and their logical network paths in the data center 700.

In this example, placing the Dbserver container 330 with operations 612 and 618 can include the following. At block 612, candidate hosts of that data center 700 that satisfy both compute requirements and network requirements for the Dbserver container can be identified. In an implementation, all possible candidate hosts in the data center 700 host can be identified. The candidate hosts for placing the Dbserver container 330 can be those hosts that meet the compute requirement and the network requirements. For example, assume the data center and application monitoring system 520 of the system 500 indicates, for that data center 700, that:

i. Traffic(Zone 720, Zone 740)=10 Gbps
  ii. Traffic(Zone 710, Zone 740)=100 Gbps
  iii. Traffic(Zone 730, Zone 740)=100 Gbps This would indicate that hosts in Zone 720 of the data center are not candidates because their data bandwidth is 10 Gbps, which is less than the 20 Gbps bandwidth requirement between the Dbserver container 330 and the Appserver container 320. Accordingly, the hosts in Zone 720 are eliminated from potential placement sites for the Dbserver container 330. Identifying candidate hosts of the data center 730 can further include comparing compute metrics of the hosts with the compute requirements of the container being placed (e.g., the Dbserver container 300). As hosts in Zone 720 were eliminated as candidates due their network bandwidth metrics, in this example, the compute metrics of hosts of Zones 710, 730 and 740 can be compared to the compute requirements of the Dbserver container 330, such as those compute requirements specified in the Dbserver portion 430 of the manifest file 400.

The set of candidate hosts in the data center 700 for placing the Dbserver container 330 can be further refined by filtering based on affinity and/or anti-affinity (affinity filtering). For instance, the candidate hosts meeting the network requirements and compute requirements can be evaluated to determine if there are any affinity or anti-affinity requirements (e.g., automatically derived requirements) for the container being placed (e.g., the Dbserver container 330). Based on the affinity rules, additional hosts or hosts in specific zones in data center 700 can be eliminated as candidate hosts. In some instances, such affinity filtering can lead to identification of a single candidate host. An example of an anti-affinity rule would be an AZ requirement affinity rule, which requires containers to be placed is different fault zones of the corresponding data center.

At block 614, each candidate host (e.g., if more than one candidate host is identified) can be scored using a formula (e.g., a heuristic formula) to determine a respective selection score for each candidate host. This formula can be weighted, in this example, using the weights 440 from the manifest file 400. The container being placed (e.g., the Dbserver container 330) can then be placed on the host with the highest score. If there is tie (e.g., two hosts have the same score), the host being placed can be placed on the candidate host that has the shortest network path to other containers that have already placed where there is traffic exchanged between those containers (and presuming other containers have already been placed). In other instances, other approaches can be used to select a host from multiple candidate hosts having a same (tie) score. In an example, a heuristic scoring formula, using the weights 440, can be expressed as:

$$\text{Score(Candidate\_Host)}=\text{weight-compute}*\text{compute-metrics}+\text{weight-network}*\text{network-metrics}+\text{weight-HA}*\text{HA-metrics}$$

The weights for a given application (which can be normalized so that their sum is equal to 1) can be used to indicate the relative importance of the requirements for compute requirements, network requirements, and HA requirements. If specific weights are not specified, default criteria of weight-compute=weight-network=weight-HA=0.33 can be used. As an example, if a specific application is expected to (is designed to) have relatively high bandwidth usage (e.g., applications that download and/or upload large amounts of data), then the weight-network value could be relatively high (e.g., 0.6), indicating that satisfying the network resource requirement is important and a key factor in the placement of the containers of that application.

The compute, network and HA metric factors can also be normalized to be between 0 and 1, with their sum equaling 1, such that these metrics indicate how closely a specific placement meets the requirements for each of these requirements, e.g., as specified in the manifest file 400. For example, an application-server tier container may specify more CPU capacity but less network bandwidth resources, while, in comparison, more network bandwidth may be specified for web-server tier containers, with the web-server tier containers specifying less (relatively less) CPU capacity.

In FIG. 7, three potential candidate hosts for placement of the Dbserver container are shown in the data center 700 as D, D' and D" to illustrate the benefits of filtering (block 612) and scoring (block 614) of the process flow 600). As noted above, the hosts of the Zone 720 were eliminated as candidate hosts due to their network bandwidth metric. Accordingly, potential placement D" would be eliminated as a candidate host and, accordingly, would not be selected for placement of the Dbserver container 330. While candidates D and D' both meet the compute requirements and network requirements, if the candidate D' were to be selected, this could result in a high network cost to reach to the data on path 752. The scoring at block 614 would result in the selection of the candidate D for placement of the Dbserver container 330 over the candidate D', due D's placement closest to the data store S and the network requirement of 20 Gbps for the Dbserver container 330. This selection also results in network efficiency by minimizing a number of hops and/or network cost (e.g., path length, segment length) when given multiple choices for placement of a given container.

After placement of the Dbserver container 330, the process flow 600 (the operations of blocks 612-618) can be used to place the Appserver container 320 (represented as A in FIG. 7) close to container the Dbserver container 330 (D) due, again, to the high network requirement between them at 20 Gbps and comparing scores among possible hosts where the Appserver container 320 (A) can be placed in relation to the Dbserver container 330 (D) that is already placed. A logical network path 760 can then be configured (at block 618) between the Appserver container 320 (A) and the Dbserver container 330 (D), as shown in FIG. 7.

At block 626, the Webserver containers 310 can then be selected for placement in the data center 700. During placement of Webserver containers 310, the candidate host list can be partitioned into the number of availability zones specified for placing the Webserver containers 310. Since two AZs are specified, the Webserver containers 310 should be placed across two zones, the Zones 720 and 730 in this example. For clarity and purposes of illustration, only two of the Webserver containers 310 (designated W1 and W6 with associated respective logical network paths 770 and 780 to the Appserver container 320 (A)) are shown in FIG. 7 to show the results of iteratively placing (e.g., with the operations of blocks 612-622) a container with a scale requirement (scale of 10) and an HA requirement (two AZs).

Figure 8A:
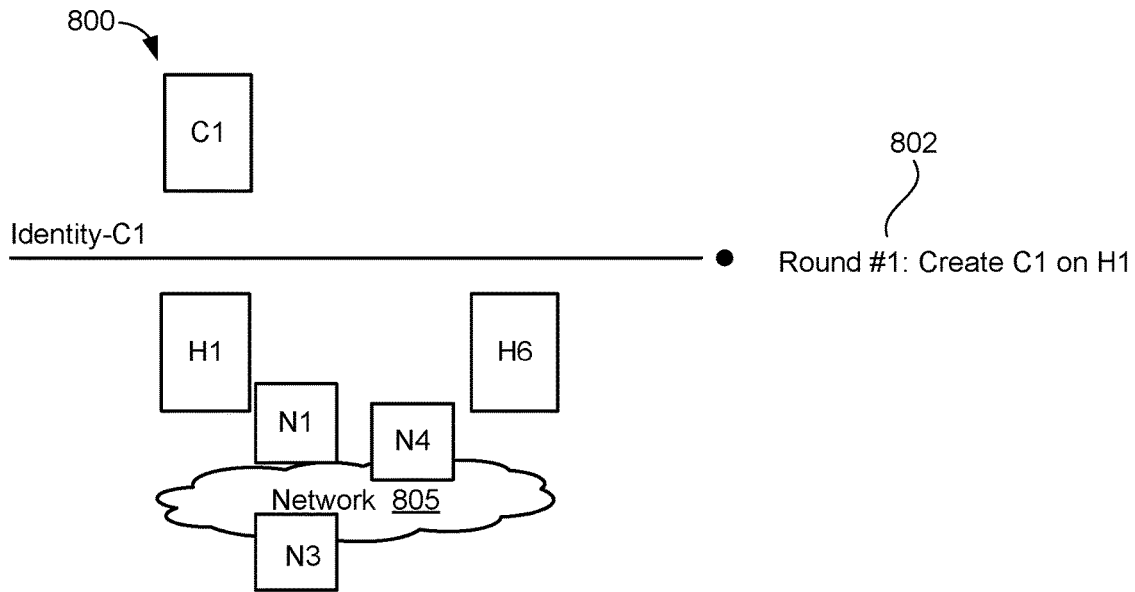
FIGS. 8A and 8B are diagrams illustrating initial placement and logical network creation for containers of an application, according to an implementation.
Figure 8B:
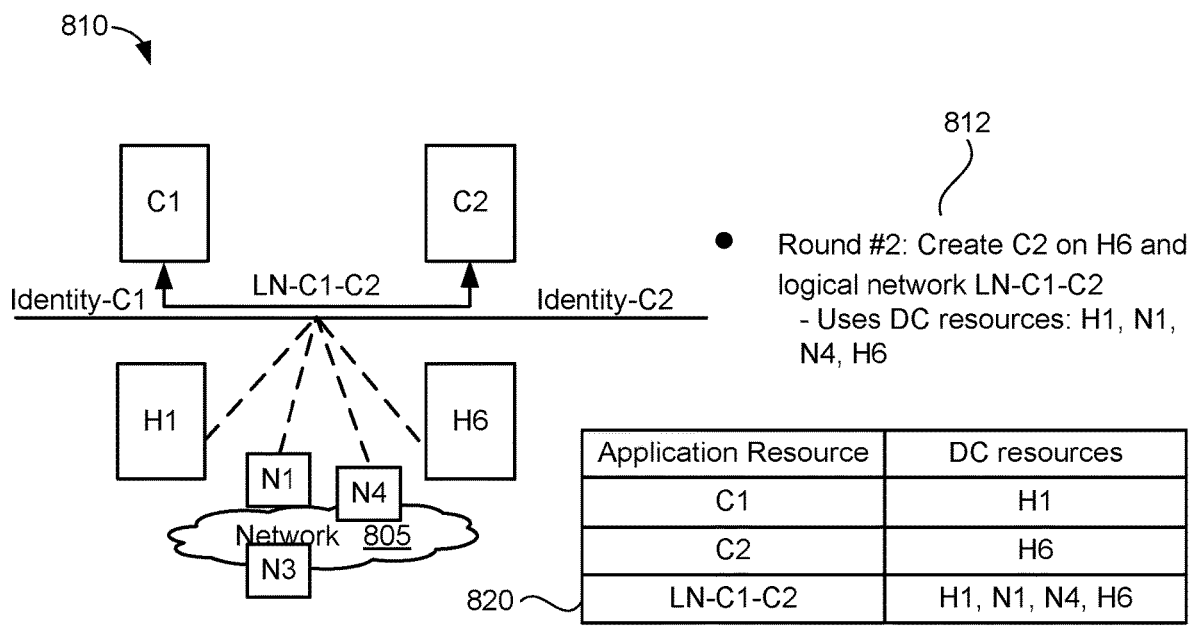

FIGS. 8A and 8B are diagrams illustrating initial placement and logical network creation for containers of an application, according to an implementation. Specifically, FIGS. 8A and 8B show, for illustrative purposes, the automatic initial provisioning (using approaches described herein) of two containers C1 and C2 and a virtual network connection (network segment) between the containers C1 and C2 for a given containerized application.

FIGS. 9A and 9B are diagrams illustrating reprovisioning of the logical network of FIGS. 8A and 8B in response to a change in an associated data center, according to an implementation. In FIGS. 9A and 9B, the logical network of FIGS. 8A and 8B is reprovisioned in response to a change in performance metrics of a network component (e.g., a switch, a virtual switch, etc.) in a data center in which the associated containers C1 and C2 are provisioned.

Figure 10A:
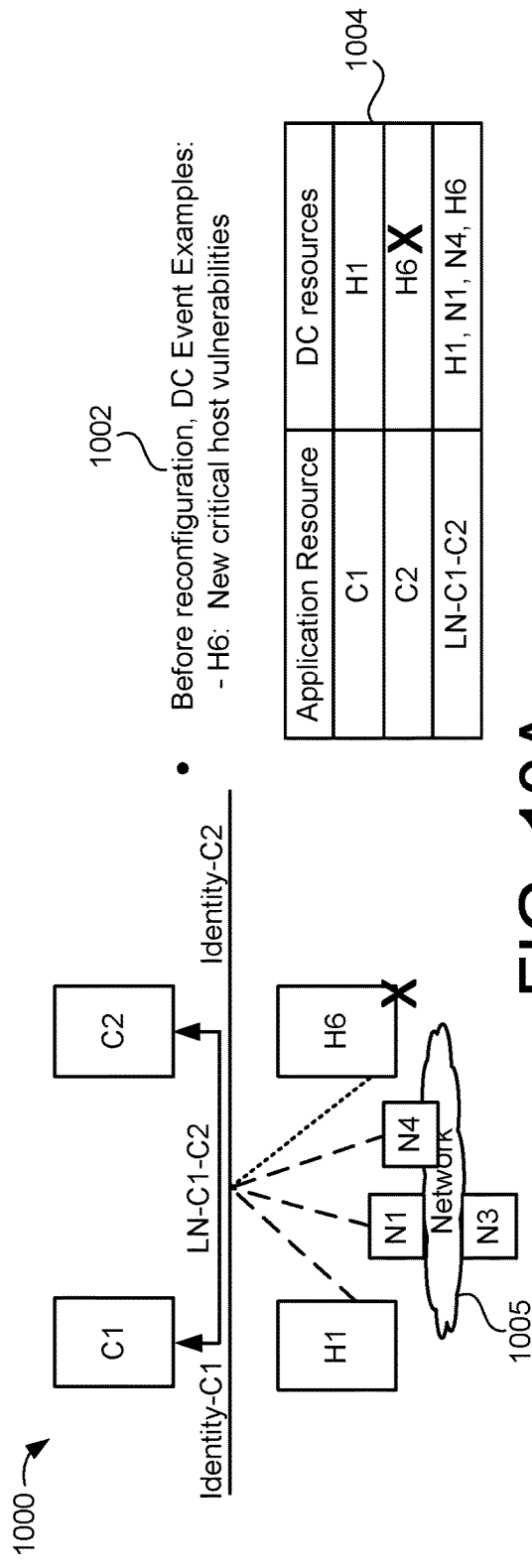
FIGS. 10A and 10B are diagrams illustrating reprovisioning of a container of FIGS. 8A and 8B in response to a change in an associated data center, according to an implementation.
Figure 10B:
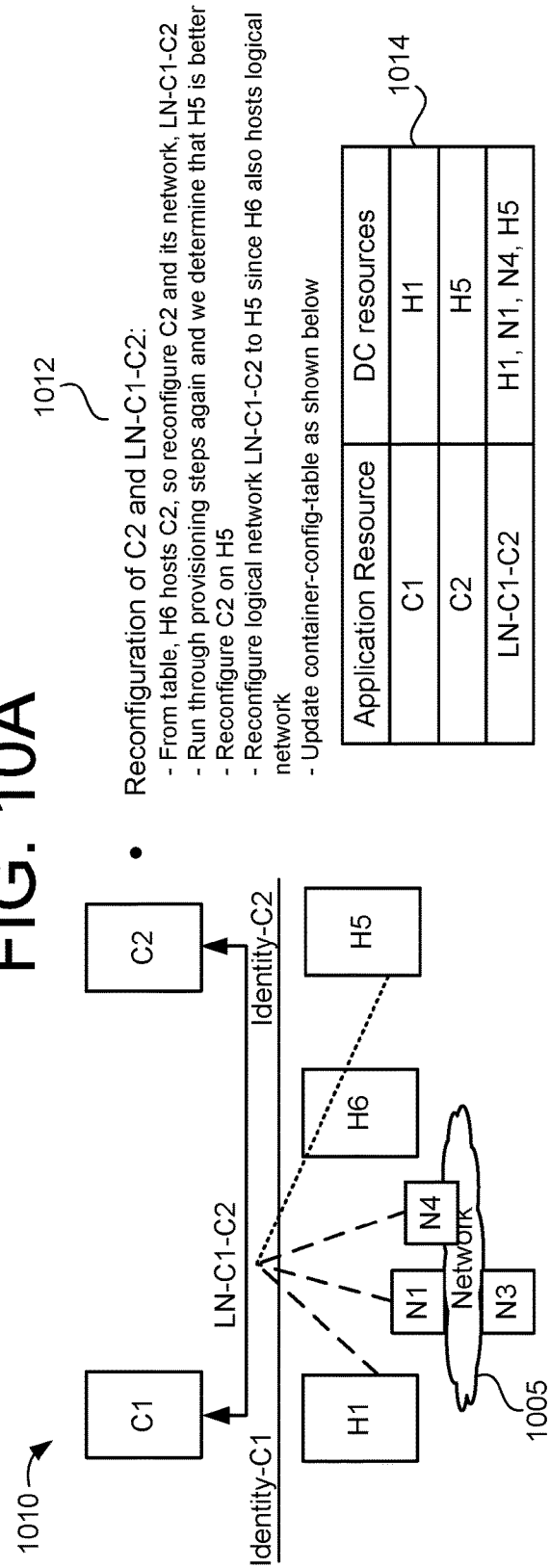

FIGS. 10A and 10B are diagrams illustrating container migration (from C2→H6 to C2→H5) and reprovisioning of the logical network of FIGS. 8A and 8B in response to another (different) change in an associated data center, according to an implementation. In FIGS. 10A and 10B, the logical network of FIGS. 8A and 8B is reprovisioned in response to a change in security metrics of a computing host (e.g., a server, a VM, etc.) in a data center in which the associated containers C1 and C2 are provisioned. While not specifically discussed with respect to each of FIGS. 8A-10B, the described provisioning and reprovisioning processes can include selecting resources using a selection process, such as the selection process discussed above with respect to FIG. 7. Also, in other implementations, other changes can trigger container migration and/or logical network reprovisioning, such as comprised and/or degraded performance of a network component, changes in the application (e.g., modifications to an SLA), changes due to scaling criteria (such as discussed above with respect to FIGS. 3 and 4), etc. Other examples of such changes (change events) that can trigger container migration and/or logical network reprovisioning are described herein (e.g., with respect to FIG. 6).

The implementations of FIGS. 8A-10B are illustrated and discussed by way of example. In other implementations, provisioning and reprovisioning of a logical network across a set of computing resources can be performed for a large number of containers (e.g., tens of thousands of containers) that are respectively included in a plurality of different applications. Further, other changes can trigger a reprovisioning process, such as changes in an application's requirements (e.g., a SLA for the application). For instance, changes triggering such reprovisioning can include those changes discussed herein, such as with respect to FIG. 6.

In FIG. 8A, a network map 800 illustrates initial provisioning of container C1, as is indicated by operation 802 of FIG. 8A. Such initial provisioning can be automatically accomplished, e.g., in accordance with the processing flow 600 illustrated in FIG. 6. As shown in FIG. 8A, for purpose of illustration, the set of computing resources of the network map 800 can include a network 805 (e.g., a network fabric), network components N1, N3 and N4 (e.g., switches, virtual switches, etc.) that operate in conjunction with the network 805, and data center (compute) hosts H1 and H6. Each of network components N1, N3, N4, H1 and H6 can be physical resources, virtual resources, and/or slices of such resources. As indicated in FIG. 8A, using the approaches described herein, the container C1 is created on data center host H1.

In FIG. 8B, a network map 810 (which is modified from the network map 800 of FIG. 8A) illustrates initial provisioning of container C2 and logical network segment between the containers C1 and C2 (such as based on one or more manifest files, as described herein). The provisioning of the container C2 and the logical network segment is indicated by operation 812 of FIG. 8B, which can be automatically accomplished in accordance with the processing flow 600 (a second round of the initial provisioning process) illustrated in FIG. 6. As shown in FIG. 8B, the logical network (LN) segment between the containers C1 and C2 is implemented using network resources N1 and N4 to connect hosts H1 (container C1) and H6 (container C2). The results of this initial provisioning is shown in a container configuration table 820 included in FIG. 8B.

In FIG. 9A, a network map 900, a data center event 902 and a container configuration table 904 indicate a change in data center performance metrics for the logical network 810 provisioned in FIGS. 8A and 8B. In this example, a data center and application monitoring system (such as in FIG. 5) can detect degraded performance metrics and compromised network security metrics for the network component N4. Based on this detected change, a determination can be made (e.g., by the container management system 510 of FIG. 5) that the logical network segment between the containers C1 and C2 should be reprovisioned (e.g., to maintain compliance with an associated SLA), which is indicated (by "X") in both the network map 900 and the container configuration table 904 of FIG. 9A.

In FIG. 9B, a network map 910 illustrates the logical network for the containers C1 and C2 after reprovisioning (reconfiguring) the network path between the containers in response to the detected changes in N4 performance metrics and in correspondence with the operation 912 in FIG. 9B. In this example, the logical network segment (connection) between the containers C1 and C2 is reprovisioned to replace the network component N4 with the network component N3. The results of the reprovisioning of the logical network segment are also shown in an updated container configuration table 914 included in FIG. 9B.

In FIG. 10A, a network map 1000, a data center event 1002 and a container configuration table 1004 indicate a change in data center performance metrics for the logical network 810 provisioned in FIGS. 8A and 8B. In this example, a data center and application monitoring system (such as in FIG. 5) detects a change in security metrics for the host H6 (e.g., a host vulnerability, such as a detected susceptibility to, or occurrence of a malicious software attack) on which the container C2 was initially provisioned in FIG. 8B. Based on this detected change, a determination can be made (e.g., by the container management system 510 of FIG. 5) that the container C2 should be reprovisioned (moved) to a different computer resource (e.g., in order to maintain compliance of an associated SLA), which is indicated (by "X") in both the network map 1000 and the container configuration table 1004 of FIG. 10A.

In FIG. 10B, a network map 1010 illustrates the logical network for the containers C1 and C2 after reprovisioning (reconfiguring) the container C2 from being implemented on H6 to being implemented on host H5. In this example, the logical network segment between the containers C1 and C2 is also reprovisioned to modify the logical network segment between the containers C1 and C2 to replace H6 with H5 as shown in the network map 1010. The results of the reprovisioning of the logical network are also shown in an updated container configuration table 1014 included in FIG. 10B.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In a first example, a computer-implemented method can include receiving a request to provision a plurality of containers of an application across a plurality of data center hosts; identifying, from the plurality of containers, a first container to provision based on, at least, a computing resource to be used to implement the first container and network requirements between the first container and the computing resource; selecting a first host from the plurality of data center hosts to implement the first container based on, at least, compute requirements of the first container, the network requirements between the first container and the computing resource, configuration of the plurality of data center hosts, and performance metrics of the plurality of data center hosts; identifying, from the plurality of containers, a second container to provision based on, at least, network requirements between the second container and the first container; and selecting a second host from the plurality of data center hosts to implement the second container based on, at least, compute requirements of the second container, the network requirements between the second container and the first container, the configuration of the plurality of data center hosts, and the performance metrics of the plurality of data center hosts.

In a second example based on the first example, the compute requirements of the first container can include a processor requirement of the first container and a storage requirement of the first container; and the network requirements between the first container and the computing resource can include at least one of a bandwidth requirement, a maximum number of hops requirement, and a latency requirement.

In a third example based on any one of the previous examples, the compute requirements of the second container can include a processor requirement and a storage requirement; and the network requirements between the second container and the first container include at least one of a bandwidth requirement, a maximum number of hops requirement, and a latency requirement.

In a fourth example based on any one of the previous examples, selecting the first host from the plurality of data center hosts to implement the first container can be further based on, at least one of, security requirements of the first container, scaling requirements of the second container, and availability requirements of the first container.

In a fifth example based on any one of the previous examples, selecting the second host from the plurality of data center hosts to implement the second container can be further based on, at least one of, security requirements of the second container, scaling requirements of the second container, affinity requirements between the first container and the second container, and availability requirements of the second container.

In a sixth example based on any one of the previous examples, the method can further include: identifying, from the plurality of containers, a third container to provision based on, at least, network requirements between the third container and the second container; and selecting a third host from the plurality of data center hosts to implement the third container based on, at least, compute requirements of the third container, network requirements between the third container and the second container, the configuration of the plurality of data center hosts, and the performance metrics of the plurality of data center hosts.

In a seventh example based on the sixth example, selecting the third host from the plurality of data center hosts to implement the third container can be further based on, at least one of, security requirements of the third container, scaling requirements of the third container, affinity requirements between the first container, the second container and the third container, and availability requirements of the third container.

In an eighth example, a computer-implemented method can include: receiving a request to provision a plurality of containers of an application across a plurality of data center hosts; identifying, from the plurality of containers, a first container to provision based on, at least, a computing resource to be used to implement the first container and network requirements between the first container and the computing resource; selecting a first host from the plurality of data center hosts to implement the first container based, at least, on compute requirements of the first container, network requirements of the first container, configuration of the plurality of data center hosts, and performance metrics of the plurality of data center hosts; identifying, from the plurality of containers, a second container to provision based on, at least, network requirements between the second container and the first container; and selecting a second host from the plurality of data center hosts to implement the second container based on, at least, compute requirements of the second container, network requirements between the first container and the second container, security requirements of the second container, scaling requirements of the second container, affinity requirements between the first container and the second container, availability requirements of the second container, the configuration of the plurality of data center hosts, and the performance metrics of the plurality of data center hosts.

In a ninth example based on the eighth example, the computing resource to be used to implement the first container can be one of data storage and Internet access.

In a tenth example based on any one of the eighth and ninth examples, the first container can be a first container type, and the second container can be a second container type, the second container type being different than the first container type.

In an eleventh example based on any one of the eighth and ninth examples, the first container and the second container can be a same container type.

In a twelfth example based on any one of the eighth through eleventh examples, the method can further include: identifying, from the plurality of containers, a third container to provision based on, at least, network requirements between the third container and the second container; and selecting a third host from the plurality of data center hosts to implement the third container based on, at least, compute requirements of the third container, network requirements of the third container, security requirements of the third container, scaling requirements of the third container, affinity requirements between the first container, the second container, and the third container, availability requirements of the third container, the configuration of the plurality of data center hosts, and the performance metrics of the plurality of data center hosts.

In a thirteenth example based on any one of the eighth, ninth and twelfth examples, the third container can be of a type that is different than a type of the first container and different than a type of the second container.

In a fourteenth example based on any one of the eighth through thirteenth examples, the performance metrics of the plurality of data center hosts can be determined dynamically.

In a fifteenth example based on any one of the eighth through fourteenth examples, the network requirements between the first container and the computing resource can be included in a manifest file for the first container; and the network requirements between the second container and the first container can be included in a manifest file for the second container.

In a sixteenth example based on any one of the eighth through fifteenth examples, selecting a first host from the plurality of data center hosts to implement the first container can be further based on, at least one of, a security requirement of the first container and an availability requirement of the first container.

In a seventeenth example based on any one of the eighth through seventeenth examples, selecting the first host from the plurality of data center hosts to implement the first container can be further based on relative weights for the compute requirements of the first container, the network requirements between the first container and the computing resource, and an availability requirement for the first container.

In an eighteenth example, a computer-implemented method can include: receiving a request to provision an application having an N number of containers across a plurality of data center hosts; and determining respective placements for the N number of containers of the application in the plurality of data center hosts, until the respective placements for the N number of containers are determined, iteratively by: selecting, for placement, a container from unplaced containers of the N number of containers, the selecting being based on one of a locality constraint and an association with previously-placed containers of the N number of containers; identifying a set of data center hosts from the plurality of data center hosts based on compute requirements of the selected container and network requirements of the selected container; assigning a respective score to each of the data center hosts of the set of data center hosts based on one or more scoring weights for the selected container, configuration of the plurality of data center hosts, and performance metrics for the data center hosts of the identified set of data center hosts; selecting, based on the respective scores, a host from the set of data center hosts for placement of the selected container; and updating a container configuration table with provisioning information for the selected container, the provisioning information including the selected host and one or more logical network paths for the selected container; and provisioning the N number of containers on the plurality of data center hosts based on the container configuration table.

In a nineteenth example based on the eighteenth example, the method can further include: receiving an indication of at least one of a change in the plurality of data center hosts and a change in the application; identifying one or more containers to reprovision based on the indication; and reprovisioning each of the identified one or more containers by, for each of the identified one or more containers being reprovisioned the method can include: identifying a modified set of data center hosts from the plurality of data center hosts based on the indication, compute requirements of the container being reprovisioned, and network requirements of the container being reprovisioned; assigning a respective score to each of the data center hosts of the modified set of data center hosts based on one or more scoring weights for the container being reprovisioned, configuration of the plurality of data center hosts, and performance metrics for the data center hosts of the modified set of data center hosts; selecting, based on the respective scores, a host from the modified set of data center hosts for placement of the container being reprovisioned; and updating the container configuration table with provisioning information for the container being reprovisioned, the provisioning information for the container being reprovisioned including the selected host from the modified set of data center hosts and one or more logical network paths for the container being reprovisioned.

In a twentieth example based on any one of the eighteenth and the nineteenth examples, placing the selected container can include placing multiple instances of the selected container in the plurality of data center hosts based on at least one of a scaling requirement for the selected container and an availability requirement of the selected container.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that the described implementations have been presented by way of example only, not limitation, and various changes in form and details can be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method including executing, by at least one processor of a computing device, instructions to implement the method, the instructions being recorded on a non-transitory computer-readable storage medium, the method comprising:
   receiving a request to provision a plurality of containers of an application across a plurality of data center hosts;
   identifying, from the plurality of containers, a first container to provision based on a computing resource to be used to implement the first container and network requirements between the first container and the computing resource, the network requirements between the first container and the computing resource defined in a manifest file for the first container;
   selecting a first host from the plurality of data center hosts to implement the first container based on compute requirements of the first container, the network requirements between the first container and the computing resource, configuration of the plurality of data center hosts, and dynamically measured performance metrics of the plurality of data center hosts;
   identifying, from the plurality of containers, a second container to provision based on the second container meeting network requirements between the second container and the first container from among remaining unplaced containers;
   automatically generating affinity requirements between the first container and the second container based on one or more affinity rules automatically derived from the manifest file, wherein the one or more affinity rules include affinity rules related to shared container resources; and
   selecting a second host from the plurality of data center hosts to implement the second container based on compute requirements of the second container, the network requirements between the second container and the first container, the configuration of the plurality of data center hosts, the automatically generated affinity requirements, and the dynamically measured performance metrics of the plurality of data center hosts.

2. The computer-implemented method of claim 1, wherein:
   the compute requirements of the first container include a processor requirement of the first container and a storage requirement of the first container; and
   the network requirements between the first container and the computing resource include at least one of a bandwidth requirement, a maximum number of hops requirement, and a latency requirement.

3. The computer-implemented method of claim 1, wherein:
   the compute requirements of the second container include a processor requirement and a storage requirement; and
   the network requirements between the second container and the first container include at least one of a bandwidth requirement, a maximum number of hops requirement, and a latency requirement.

4. The computer-implemented method of claim 1, wherein selecting the first host from the plurality of data center hosts to implement the first container is further based on, at least one of, security requirements of the first container, scaling requirements of the second container, and availability requirements of the first container.

5. The computer-implemented method of claim 1, wherein selecting the second host from the plurality of data center hosts to implement the second container is further based on, at least one, of security requirements of the second container, scaling requirements of the second container, and availability requirements of the second container.

6. The computer-implemented method of claim 1, wherein the one or more affinity rules further include one or more of affinity rules related to defined data center fault regions, a shared data file, a shared filesystem, a shared IP address, placement on a same host, and a proximity to a shared resource.

7. The computer-implemented method of claim 1, further comprising:

identifying, from the plurality of containers, a third container to provision based on network requirements between the third container and the second container; and selecting a third host from the plurality of data center hosts to implement the third container based on compute requirements of the third container, network requirements between the third container and the second container, the configuration of the plurality of data center hosts, and the performance metrics of the plurality of data center hosts.

8. The computer-implemented method of claim 7, wherein selecting the third host from the plurality of data center hosts to implement the third container is further based on, at least one of, security requirements of the third container, scaling requirements of the third container, affinity requirements between the first container, the second container and the third container, and availability requirements of the third container.

9. A computer-implemented method including executing, by at least one processor of a computing device, instructions to implement the method, the instructions being recorded on a non-transitory computer-readable storage medium, the method comprising:
receiving a request to provision a plurality of containers of an application across a plurality of data center hosts;
identifying, from the plurality of containers, a first container to provision based on a computing resource to be used to implement the first container and network requirements between the first container and the computing resource, the network requirements between the first container and the computing resource defined in a manifest file for the first container;
selecting a first host from the plurality of data center hosts to implement the first container based on compute requirements of the first container, network requirements of the first container, configuration of the plurality of data center hosts, and performance metrics of the plurality of data center hosts;
identifying, from the plurality of containers, a second container to provision based on the second container meeting network requirements between the second container and the first container from among remaining unplaced containers;
automatically generating affinity requirements between the first container and the second container based on one or more affinity rules automatically derived from the manifest file, wherein the one or more affinity rules include affinity rules related to shared container resources; and
selecting a second host from the plurality of data center hosts to implement the second container based on compute requirements of the second container, network requirements between the first container and the second container, security requirements of the second container, scaling requirements of the second container, the automatically generated affinity requirements between the first container and the second container, availability requirements of the second container, the configuration of the plurality of data center hosts, and the performance metrics of the plurality of data center hosts.

10. The computer-implemented method of claim 9, wherein the computing resource to be used to implement the first container is one of data storage and Internet access.

11. The computer-implemented method of claim 9, wherein the first container is a first container type, and the second container is a second container type, the second container type being different than the first container type.

12. The computer-implemented method of claim 9, wherein the first container and the second container are a same container type.

13. The computer-implemented method of claim 9, wherein the performance metrics of the plurality of data center hosts are determined dynamically.

14. The computer-implemented method of claim 9, wherein:
the network requirements between the second container and the first container is included in a manifest file for the second container.

15. The computer-implemented method of claim 9, wherein:
selecting the first host from the plurality of data center hosts to implement the first container is further based on, at least one of, a security requirement of the first container and an availability requirement of the first container.

16. The computer-implemented method of claim 9, wherein:
selecting the first host from the plurality of data center hosts to implement the first container is further based on relative weights for the compute requirements of the first container, the network requirements between the first container and the computing resource, and an availability requirement for the first container.

17. The computer-implemented method of claim 9, wherein the one or more affinity rules further include one or more of affinity rules related to defined data center fault regions, a shared data file, a shared filesystem, a shared IP address, placement on a same host, and a proximity to a shared resource.

18. The computer-implemented method of claim 9, further comprising:
identifying, from the plurality of containers, a third container to provision based on network requirements between the third container and the second container; and
selecting a third host from the plurality of data center hosts to implement the third container based on compute requirements of the third container, network requirements of the third container, security requirements of the third container, scaling requirements of the third container, affinity requirements between the first container, the second container, and the third container, availability requirements of the third container, the configuration of the plurality of data center hosts, and the performance metrics of the plurality of data center hosts.

19. The computer-implemented method of claim 18, wherein the third container is of a type that is different than a type of the first container and different than a type of the second container.

20. A computer-implemented method including executing, by at least one processor of a computing device, instructions to implement the method, the instructions being recorded on a non-transitory computer-readable storage medium, the method comprising:
receiving a request to provision an application having an N number of containers across a plurality of data center hosts; and
determining respective placements for the N number of containers of the application in the plurality of data center hosts, until the respective placements for the N number of containers are determined, iteratively by:

selecting, for placement, a container from unplaced containers of the N number of containers, the selecting being based on one of a locality constraint and an association with previously-placed containers of the N number of containers;

automatically generating affinity requirements between the selected container and the previously-placed containers based on one or more affinity rules automatically derived from a manifest file, wherein the one or more affinity rules include affinity rules related to shared container resources;

identifying a set of data center hosts from the plurality of data center hosts based on compute requirements of the selected container, network requirements of the selected container, and the automatically generated affinity requirements;

assigning a respective score to each of the data center hosts of the set of data center hosts based on one or more scoring weights for the selected container, configuration of the plurality of data center hosts, and performance metrics for the data center hosts of the identified set of data center hosts;

selecting, based on the respective scores, a host from the set of data center hosts for placement of the selected container; and updating a container configuration table with provisioning information for the selected container, the provisioning information including the selected host and one or more logical network paths for the selected container; and provisioning the N number of containers on the plurality of data center hosts based on the container configuration table.

21. The computer-implemented method of claim 20, further comprising:

receiving an indication of at least one of a change in the plurality of data center hosts and a change in the application;

identifying one or more containers to reprovision based on the indication; and reprovisioning each of the identified one or more containers by, for each of the identified one or more containers being reprovisioned the method includes:

identifying a modified set of data center hosts from the plurality of data center hosts based on the indication, compute requirements of the container being reprovisioned, and network requirements of the container being reprovisioned;

assigning a respective score to each of the data center hosts of the modified set of data center hosts based on one or more scoring weights for the container being reprovisioned, configuration of the plurality of data center hosts, and performance metrics for the data center hosts of the modified set of data center hosts;

selecting, based on the respective scores, a host from the modified set of data center hosts for placement of the container being reprovisioned; and updating the container configuration table with provisioning information for the container being reprovisioned, the provisioning information for the container being reprovisioned including the selected host from the modified set of data center hosts and one or more logical network paths for the container being reprovisioned.

22. The computer-implemented method of claim 20, wherein placing the selected container includes placing multiple instances of the selected container in the plurality of data center hosts based on at least one of a scaling requirement for the selected container and an availability requirement of the selected container.

23. The computer-implemented method of claim 20, wherein the one or more affinity rules further include one or more of affinity rules related to defined data center fault regions, a shared data file, a shared filesystem, a shared IP address, placement on a same host, and a proximity to a shared resource.

* * * * *